US012737904B2

(12) United States Patent
Nousias et al.

(10) Patent No.: US 12,737,904 B2
(45) Date of Patent: Sep. 15, 2026

(54) MIXED-MODE DEPTH IMAGING

(71) Applicant: QUALCOMM Incorporated, San Diego, CA (US)

(72) Inventors: Ioannis Nousias, San Diego, CA (US); Matthieu Jean Olivier Dupre, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/261,096

(22) PCT Filed: Sep. 24, 2021

(86) PCT No.: PCT/US2021/051977
§ 371 (c)(1),
(2) Date: Jul. 11, 2023

(87) PCT Pub. No.: WO2022/203717
PCT Pub. Date: Sep. 29, 2022

(65) Prior Publication Data

US 2024/0070886 A1 Feb. 29, 2024

(30) Foreign Application Priority Data

Mar. 26, 2021 (GR) .............................. 20210100191

(51) Int. Cl.

| | |
|---|---|
| ***G06T 7/521*** | (2017.01) |
| ***G01S 17/08*** | (2006.01) |
| ***G01S 17/894*** | (2020.01) |

(52) U.S. Cl.
CPC .............. *G06T 7/521* (2017.01); *G01S 17/08* (2013.01); *G01S 17/894* (2020.01); *G06T 2207/10028* (2013.01)

(58) Field of Classification Search
CPC ........... G06T 7/521; G06T 2207/10028; G01S 17/894; G01S 17/08
See application file for complete search history.

(56) References Cited

U.S. PATENT DOCUMENTS

| | | | | |
|---|---|---|---|---|
| 9,325,973 | B1 * | 4/2016 | Hazeghi | H04N 13/296 |
| 11,509,803 | B1 * | 11/2022 | Li | H04N 23/95 |

(Continued)

FOREIGN PATENT DOCUMENTS

| | | | |
|---|---|---|---|
| EP | 2955544 | A1 | 12/2015 |
| WO | 2016111878 | A1 | 7/2016 |

OTHER PUBLICATIONS

International Search Report and Written Opinion—PCT/US2021/051977—ISA/EPO—Jan. 4, 2022.

*Primary Examiner* — Ming Shui
(74) *Attorney, Agent, or Firm* — Polsinelli LLPQUALCOMM Incorporated

(57) ABSTRACT

Systems and techniques are described for generating depth map(s). For instance, a process can include obtaining a frame including a reflected pattern of light generated based on a pattern of light that is based on a primitive including a set of uniquely identifiable features. The process can include determining, using a time-of-flight (ToF) sensor, a first distance measurement associated with a pixel of the frame, and determining a search space within the primitive based on the first distance measurement. The process can include determining, based on searching the search space, a feature of the primitive corresponding to a region around the pixel of the frame. The process can include determining a second distance measurement associated with the pixel of the frame based on determining the feature of the primitive. The process can include generating a depth map based at least in part on the second distance measurement.

30 Claims, 16 Drawing Sheets

(56) References Cited

U.S. PATENT DOCUMENTS

| | | | |
|---|---|---|---|
| 2019/0079192 | A1 | 3/2019 | Fenton et al. |
| 2020/0090355 | A1 | 3/2020 | Hall |
| 2020/0386540 | A1 | 12/2020 | Hseih et al. |

* cited by examiner

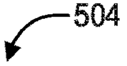
FIG. 5A

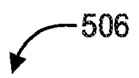
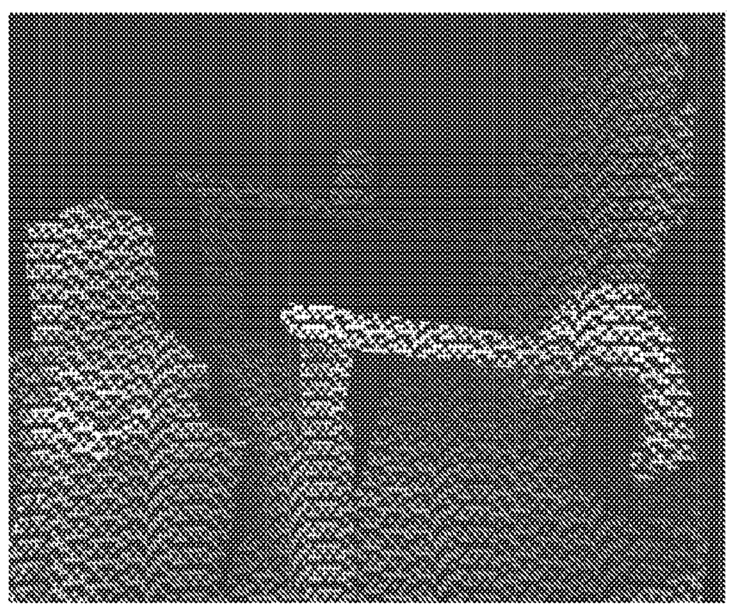
508
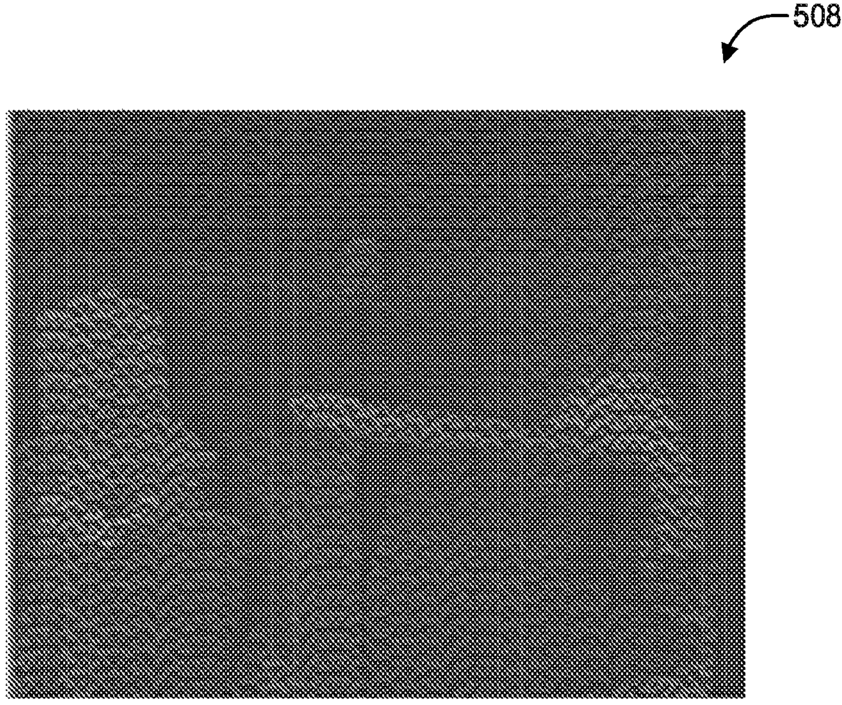
FIG. 5B

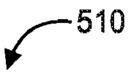
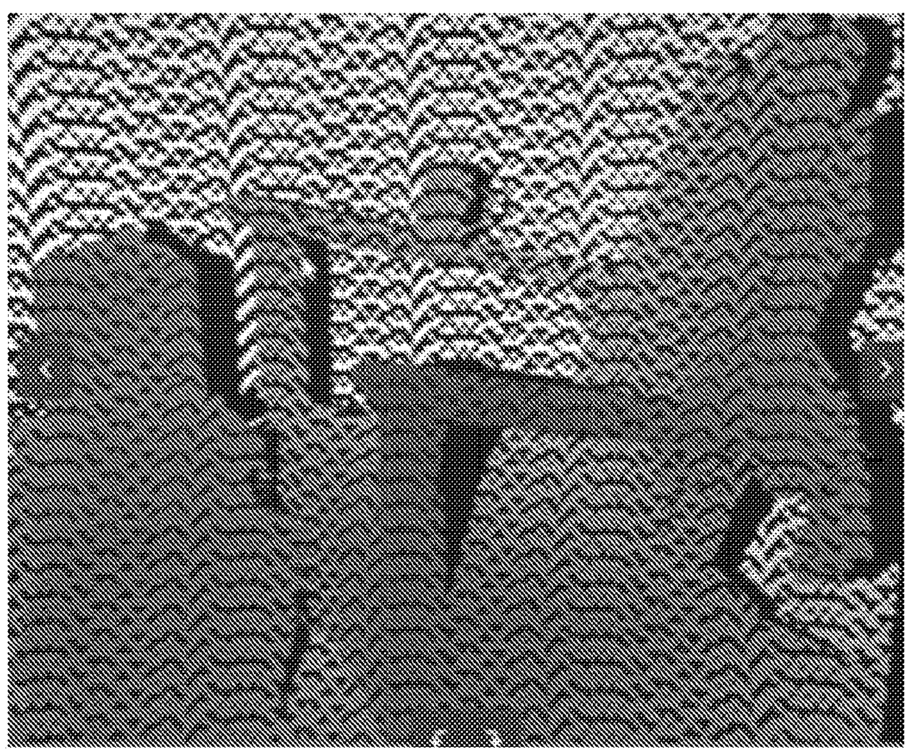
FIG. 5C

1000

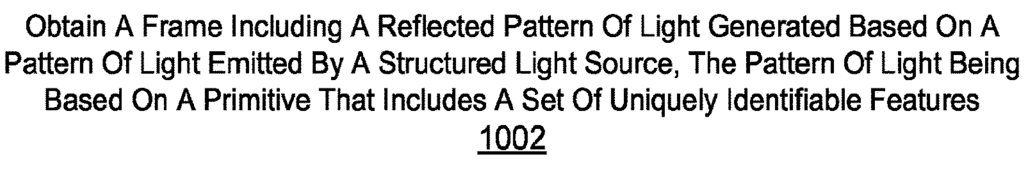

Determine, Using A ToF Sensor, A First Distance Measurement Associated With A Pixel Of The Frame
1004

Determine, Based At Least In Part On The First Distance Measurement, A Search Space Within The Primitive, The Search Space Including A Subset Of Features From The Set Of Features Of The Primitive
1006

Determine, Based On Searching The Search Space Within The Primitive, A Feature Of The Primitive Corresponding To A Region Around The Pixel Of The Frame
1008

Determine A Second Distance Measurement Associated With The Pixel Of The Frame Based At Least In Part On Determining The Feature Of The Primitive From The Search Space Within The Primitive
1010

Generate A Depth Map Based At Least In Part On The Second Distance Measurement
1012

FIG. 10

MIXED-MODE DEPTH IMAGING

FIELD

The present disclosure is related to depth imaging. For example, aspects of the present disclosure relate to combining techniques for structured light and time-of-flight (ToF) depth imaging.

BACKGROUND

Image sensors are commonly integrated into a wide array of electronic devices such as cameras, mobile phones, autonomous systems (e.g., autonomous drones, cars, robots, etc.), smart wearables, extended reality (e.g., augmented reality, virtual reality, mixed reality) devices, and many other devices. The image sensors allow users to capture video and images from any electronic device equipped with an image sensor. The video and images can be captured for recreational use, professional photography, surveillance, and automation, among other applications. The video and images captured by image sensors can be manipulated in various ways to increase the quality of the video or images and create certain artistic effects.

In some cases, light signals and image data captured by an image sensor can be analyzed to identify certain characteristics about the image data and/or the scene captured by the image data, which can then be used to modify the captured image data or perform various tasks. For example, light signals and/or image data can be analyzed to estimate a distance of the scene captured by the image data. Estimating distance information can be useful for a variety of applications, such as three-dimensional (3D) photography, extended reality experiences, object scanning, autonomous vehicle operation, Earth topography measurements, computer vision systems, facial recognition systems, robotics, gaming, and creating various artistic effects, such as blurring and bokeh effects (e.g., out-of-focus effects). However, estimating distance information with sufficient resolution and/or accuracy can be prohibitively power and compute intensive.

SUMMARY

Systems and techniques are described herein for performing mixed-mode depth imaging at least in part by combining techniques for structured light and time-of-flight (ToF) depth imaging. According to one illustrative example, a method of generating one or more depth maps is provided. The method includes: obtaining a frame including a reflected pattern of light generated based on a pattern of light emitted by a structured light source, the pattern of light being based on a primitive that includes a set of uniquely identifiable features; determining, using a ToF sensor, a first distance measurement associated with a pixel of the frame; determining, based at least in part on the first distance measurement, a search space within the primitive, the search space including a subset of features from the set of uniquely identifiable features of the primitive; determining, based on searching the search space within the primitive, a feature of the primitive corresponding to a region around the pixel of the frame; determining a second distance measurement associated with the pixel of the frame based at least in part on determining the feature of the primitive from the search space within the primitive; and generating a depth map based at least in part on the second distance measurement.

In another example, an apparatus for generating one or more depth maps is provided. The apparatus includes a structured light source configured to emit a pattern of light based on a primitive. The primitive includes a set of uniquely identifiable features. The apparatus further includes a time-of-flight (ToF) sensor, at least one memory, and one or more processors coupled to the at least one memory. The one or more processors are configured to: obtain a frame including a reflected pattern of light generated based on the pattern of light emitted by the structured light source; determine, using the ToF sensor, a first distance measurement associated with a pixel of the frame; determine, based at least in part on the first distance measurement, a search space within the primitive, the search space including a subset of features from the set of uniquely identifiable features of the primitive; determine, based on searching the search space within the primitive, a feature of the primitive corresponding to a region around the pixel of the frame; determine a second distance measurement associated with the pixel of the frame based at least in part on determining the feature of the primitive from the search space within the primitive; and generate a depth map based at least in part on the second distance measurement.

In another example, a non-transitory computer-readable medium is provided that has stored thereon instructions that, when executed by one or more processors, cause the one or more processor to: obtain a frame including a reflected pattern of light generated based on a pattern of light emitted by a structured light source, the pattern of light being based on a primitive that includes a set of uniquely identifiable features; determine, using a ToF sensor, a first distance measurement associated with a pixel of the frame; determine, based at least in part on the first distance measurement, a search space within the primitive, the search space including a subset of features from the set of uniquely identifiable features of the primitive; determine, based on searching the search space within the primitive, a feature of the primitive corresponding to a region around the pixel of the frame; determine a second distance measurement associated with the pixel of the frame based at least in part on determining the feature of the primitive from the search space within the primitive; and generate a depth map based at least in part on the second distance measurement.

In another example, an apparatus for performing temporal blending for one or more frames is provided. The apparatus includes: means for obtaining a frame including a reflected pattern of light generated based on a pattern of light emitted by a structured light source, the pattern of light being based on a primitive that includes a set of uniquely identifiable features; means for determining, using a ToF sensor, a first distance measurement associated with a pixel of the frame; means for determining, based at least in part on the first distance measurement, a search space within the primitive, the search space including a subset of features from the set of uniquely identifiable features of the primitive; means for determining, based on searching the search space within the primitive, a feature of the primitive corresponding to a region around the pixel of the frame; means for determining a second distance measurement associated with the pixel of the frame based at least in part on determining the feature of the primitive from the search space within the primitive; and means for generating a depth map based at least in part on the second distance measurement.

In some aspects, the method, apparatuses, and computer-readable medium may include (or are configured to): obtaining a first exposure of the frame associated with a first level of illumination; obtaining a second exposure of the frame associated with a second level of illumination that is different than the first level of illumination; and determining the first distance measurement associated with the pixel of the frame based at least in part on a comparison between a first light amplitude associated with the pixel in the first exposure and a second light amplitude associated with the pixel in the second exposure.

In some aspects, the first distance measurement includes a range of distance measurements. In some aspects, the method, apparatuses, and computer-readable medium may include determining (or are configured to) a size of the search space within the primitive based at least in part on the range of distance measurements. For instance, a large range of distance measurements is associated with a large size of the search space. In some cases, the method, apparatuses, and computer-readable medium may include determining (or are configured to determine) the range of distance measurements based at least in part on a level of ambiguity associated with the ToF sensor. For instance, a high level of ambiguity is associated with a large range of distance measurements.

In some aspects, the method, apparatuses, and computer-readable medium may include (or are configured to): determining, based at least in part on the first distance measurement, an offset between a first location of the pixel of the frame and a second location of the feature of the primitive, wherein the offset is inversely proportional to the first distance measurement; and determining the search space within the primitive based at least in part on the offset. In some cases, the method, apparatuses, and computer-readable medium may include setting (or are configured to set) a central axis of the search space within the primitive as the second location of the feature of the primitive.

In some aspects, the region around the pixel of the frame has a predetermined size. In such aspects, the method, apparatuses, and computer-readable medium may include (or are configured to): determining a first region of the search space, the first region of the search space having the predetermined size; and determining whether image data within the region around the pixel of the frame corresponds to image data within the first region of the search space. In some cases, the method, apparatuses, and computer-readable medium may include (or are configured to): determining the image data within the region around the pixel of the frame corresponds to the image data within the first region of the search space; and determining the second distance measurement based at least in part on determining a distance between the pixel of the frame and a corresponding feature of the first region of the search space. In some cases, the method, apparatuses, and computer-readable medium may include (or are configured to): determining the image data within the region around the pixel of the frame does not correspond to the image data within the first region of the search space within the primitive; determining a second region of the search space, the second region of the search space having the predetermined size; and determining whether image data within the region around the pixel of the frame corresponds to image data within the second region of the search space.

In some aspects, the pattern of light emitted by the structured light source includes a plurality of light points. In some aspects, a feature within the set of uniquely identifiable features of the primitive includes two or more light points of the plurality of light points. In some cases, a light point of the feature corresponds to two or more pixels of the frame.

In some aspects, the structured light source is configured to emit the pattern of light using a diffractive optical element that simultaneously projects a plurality of patterns of light corresponding to the primitive.

In some aspects, the method, apparatuses, and computer-readable medium may include (or are configured to): obtaining an additional frame while the structured light source is not emitting the pattern of light based on the primitive; determining ambient light signals based at least in part on the additional frame; and subtracting the ambient light signals from the frame before determining the first distance measurement associated with the pixel of the frame. In some cases, the method, apparatuses, and computer-readable medium may include (or are configured to): determining light signals corresponding to multi-path interference using the frame after subtracting the ambient light signals from the frame; and subtracting the light signals corresponding to multi-path interference from the frame before determining the first distance measurement associated with the pixel of the frame.

In some aspects, the method, apparatuses, and computer-readable medium may include fitting (or are configured to fit) a function to light signals corresponding to the pixel of the frame before determining the first distance measurement associated with the pixel of the frame.

In some aspects, the apparatus is, is part of, and/or includes a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle or a computing device or component of a vehicle, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5A illustrates example frame exposures captured by ToF depth imaging systems, in accordance with some examples;

FIG. 5B illustrates example frame exposures captured by mixed-mode depth imaging systems, in accordance with some examples;

FIG. 5C illustrates an example ToF depth map generated by mixed-mode depth imaging systems, in accordance with some examples;

FIG. 10 is a flow diagram illustrating an example of a process for mixed-mode depth imaging, in accordance with some examples;

DETAILED DESCRIPTION

Figure 1:
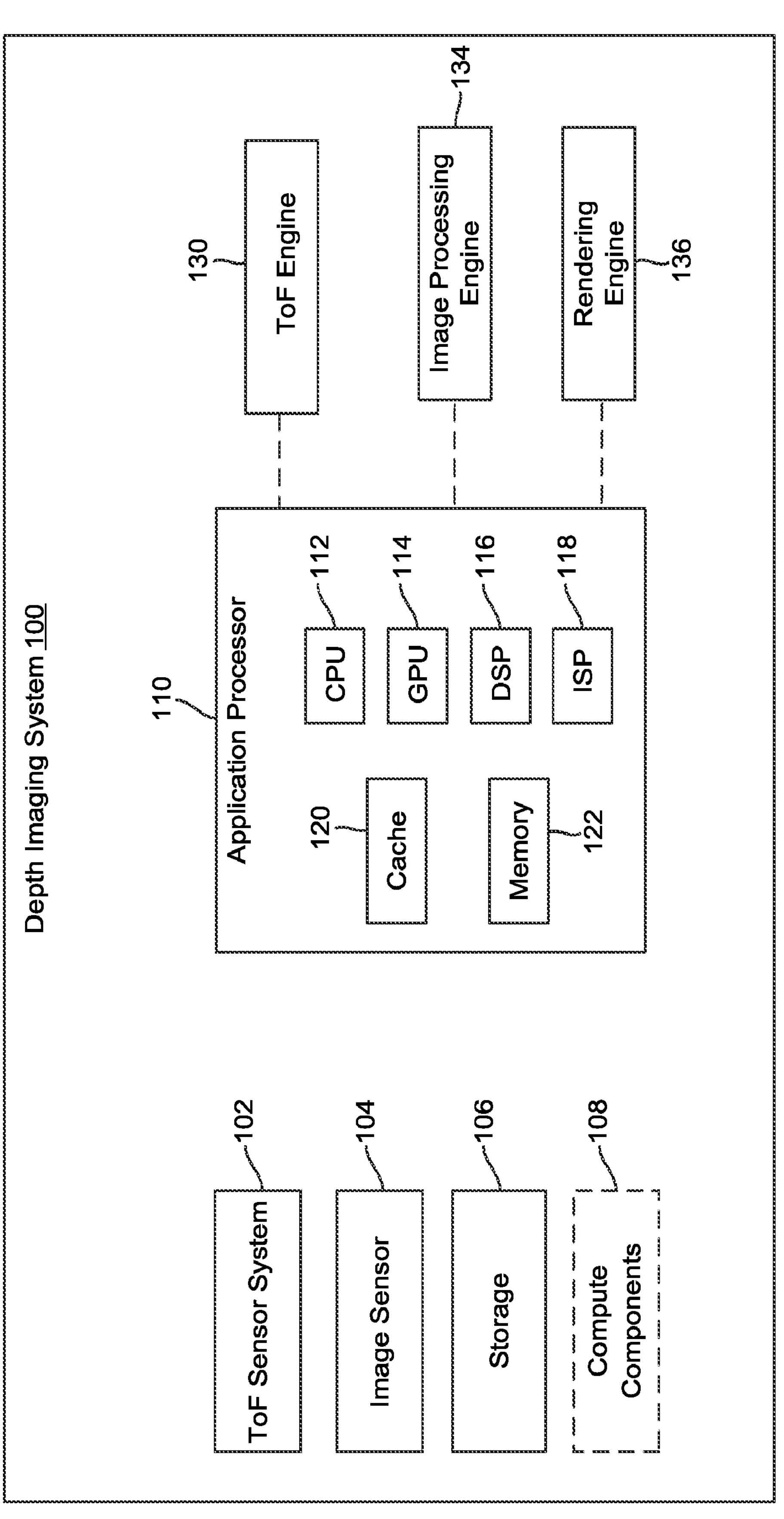
FIG. 1 is a block diagram illustrating an example architecture of a time-of-flight (ToF) depth imaging system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Various systems and/or applications make use of three-dimensional (3D) information representing a scene, such as systems and/or applications that perform face recognition, authentication systems that use a subject's face identification (ID), object scanning, object detection, object grasping, object tracking, autonomous driving, robotics, aviation navigation (e.g., for unmanned aerial vehicles, airplanes, among others), indoor navigation, extended reality (e.g., augmented reality (AR), virtual reality (VR), mixed reality (MR), etc.), 3D scene understanding, among other tasks. Recent needs to capture 3D information from a scene have created a high demand for active depth sensing technologies.

Structured light systems are one example of a technology that offers a reliable and highly accurate depth capture system. In general, a structured light system can include one or more structured light projectors and sensors for scanning and/or determining the dimensions and/or movement of a scene and/or one or more objects (e.g., a person, a device, an animal, a vehicle, etc.) in the scene. A structured light projector can project a known shape or pattern of light onto the scene including the one or more objects, and a sensor can receive light reflected from the one or more objects in the scene. The structured light system can determine the dimensions of and/or movement within the scene (e.g., the dimensions and/or movement of the one or more objects within the scene) based on measured or detected deformations of the shape or pattern.

Time-of-flight (ToF) technology is another example that offers an efficient and high-resolution depth capture system. In general, a ToF system can include one or more light emitters and one or more sensors. For instance, a light emitter is used to emit light signals towards a target (e.g., one or more objects in a scene), which can hit the target and return to the one or more sensors based on the light signals reflecting off of the target. The one or more sensors can detect and/or measure the reflected light, which can then be used to determine depth and/or distance information for the target. A direct ToF system can determine depth and/or distance information based on the travel time of an emitted light signal (e.g., from the time when the light signal is emitted to a time when a corresponding returned/reflected light signal is received). An indirect ToF system can determine depth and/or distance information based on two frames captured using two exposures of pulsed light that are spaced apart by a period of time. Depth and/or distance information for one point in the frames can correspond to a ratio of the light amplitude of the point in one frame to the light amplitude of the point in the other frame. An indirect ToF system can also determine depth and/or distance information based on a phase shift between an emitted light signal and a corresponding returned/reflected light signal.

Structured light and ToF depth capture systems offer various advantages and disadvantages. For example, a structured light system may be capable of determining highly accurate depth information, but may have limited resolution and/or high computational complexity. A ToF system may be capable of generating high-resolution depth maps with low computational complexity, but the accuracy of the depth maps may be degraded by noise and/or light scattering.

The present disclosure describes systems, apparatuses, methods, and computer-readable media (collectively referred to as "systems and techniques") that provide improved depth imaging. The systems and techniques provide the ability for a depth imaging system to generate depth maps based on a combination of structured light techniques and ToF techniques. Such a depth imaging system can be referred to as a "mixed-mode" depth imaging system that can perform mixed-mode depth imaging. In some cases, a mixed-mode depth imaging system can project a pattern of light in accordance with a primitive of a structured light emitter. In some cases, the projected pattern of light can include a pattern with the primitive being repeated or tessellated (e.g., using a diffractive optical element or DOE) in an overlapping or non-overlapping manner. The depth imaging system can then determine distance measurements associated with returned (or reflected) light using a ToF sensor. The ToF distance measurements can be used to expedite (and with better efficiency) determining additional (e.g., more accurate) distance measurements using structured light techniques. For example, the depth imaging system can use the ToF distance measurements to reduce the search space of a structured light decoder.

As noted above, in some examples, the depth imaging system can include a structured light emitter configured to emit a pattern of light that includes a tessellated (e.g., or repeated) primitive pattern (also referred to as a primitive), such as using a DOE positioned relative to the structured light emitter. The primitive can include multiple uniquely identifiable features (also known as “codewords”). For instance, a feature or codeword in the primitive can include a 4×4 arrangement of light points (also known as “dots”). As described herein, a feature (or codeword) can be used to perform matching between a captured frame and the primitive pattern, as described herein. In some cases, the depth imaging system can generate the primitive pattern using a vertical-cavity surface-emitting laser (VCSEL) and can tessellate the primitive pattern using a DOE. In some examples, each dot in the primitive can correspond to a single VCSEL in the VCSEL array. The depth imaging system can project the tessellated primitive pattern onto objects within the scene.

One or more sensors of the depth imaging system can capture a frame based on the pattern of light (including the repeated primitive pattern) being reflected by the objects within the scene and returning to the depth imaging system. Each dot of the primitive pattern may occupy multiple pixels in a captured frame. In one illustrative example, the system can be set up (e.g., the lens of the receiver and transmitter, etc.) so that each dot of the primitive corresponds to a 4×4 arrangement of pixels in a captured frame. As noted above, a feature (or codeword) can include a 4×4 arrangement of dots, which can result in a feature occupying 16×16 pixels in a captured frame when each dot occupies 4×4 pixels.

Pixels of the frame may be offset (e.g., displaced) relative to corresponding dots of the original primitive pattern. The values of these offsets correspond to and/or indicate the depth of objects associated with the pixels. In some cases, traditional structured light systems can determine the depth associated with a pixel of a frame by obtaining a region (or block) of pixels around the pixel (e.g., a 16×16 block of pixels) and searching the primitive for a uniquely identifiable feature that corresponds to (e.g., matches or is most similar to) a “feature” in the region of pixels around the pixel. This technique can involve searching the entirety of the primitive to identify the corresponding (e.g., most similar) pixel, which may require extensive time and/or processing power. For example, structured light decoding typically includes identifying, for each pixel of a frame, a region around that pixel (e.g., a 16×16 block) out of possible same sized patterns from the primitive (e.g., which can have a size of 124×64). Using a block-matching type of decoding, the depth imaging system can compare every 4×4 region of dots in the primitive to the 16×16 neighborhood around the current pixel from the frame.

To avoid searching the entirety of a primitive, the mixed-mode depth imaging system can determine a search space including regions (e.g., blocks, slices, or sections) of the primitive to be searched based on ToF distance measurements associated with light points in the frame. For example, the depth imaging system can determine ToF distance measurements (e.g., indirect ToF distance measurements) for all or a portion of the light points of the reflected primitive pattern. Based on a ToF distance measurement associated with one pixel of the frame, the depth imaging system can determine a search space within the primitive likely and/or expected to include a uniquely identifiable feature that corresponds to the feature in the region of pixels around the pixel of the frame. For example, the ToF distance measurement can correspond to an estimated (e.g., unrefined) offset between the feature of the frame and the corresponding feature of the primitive. The search space within the primitive to be searched can include dots of the primitive that are at or nearby the estimated offset. In some cases, the size (e.g., width) of the search space can be defined based at least in part on a level of ambiguity associated with the ToF measurement. The level of ambiguity may be a result of the configuration of the ToF sensor and/or inherent inaccuracies in ToF systems (which may be generally less accurate than structured light systems). In an illustrative example, the search space within the primitive can be defined as being centered at the offset and having a width corresponding to the level of ambiguity of the ToF measurement. A higher level of ambiguity can correspond to a larger width. Further, the search space within the primitive can span all or a portion of the height of the primitive.

After defining the search space within the primitive, the mixed-mode depth imaging system can search within the search space to identify the feature of the primitive corresponding to the “feature” formed by a region of pixels around the pixel of the frame. In some cases, the mixed-mode depth imaging system can search the search space of the primitive by comparing a block of frame pixels surrounding a particular frame pixel to blocks of dots from the primitive that have a corresponding size. For instance, a 16×16 block of pixels around a pixel in the frame (e.g., with the pixel being in the middle of the 16×16 block) can be compared to various 16×16 blocks of dots that are within the search space of the primitive. The blocks or regions can be of any suitable and/or predetermined size (e.g., 16×16, 32×32, 64×64, etc.). In one illustrative example, the mixed-mode depth imaging system can compare the blocks using a dot product similarity measurement or any other suitable similarity measurement.

Once the mixed-mode depth imaging system identifies the corresponding feature within the search space of the primitive, the mixed-mode depth imaging system can determine a more precise (e.g., refined) distance measurement associated with the particular frame pixel. For instance, the mixed-mode depth imaging system can determine the exact offset between the location of the feature in the region of pixels around the frame pixel and the location of the corresponding primitive feature. In some examples, the mixed-mode depth imaging system can repeat the mixed-mode depth imaging process for all or a portion of the additional pixels of the frame.

The mixed-mode depth imaging system can generate a depth map of the scene based on the determined distance measurements (e.g., the refined distance measurements). In some cases, the depth map can be as accurate and/or precise as depth maps generated using conventional structured light systems. Further, by determining relatively small regions of the primitive (within the search space) to search based on ToF distance measurements, the mixed-mode depth imaging system can generate the depth map in less time and/or with lower computational complexity than conventional structured light systems.

In some cases, the systems and techniques described herein (e.g., the mixed-mode depth imaging system) can perform one or more operations to improve the accuracy of ToF distance measurements. Improving the accuracy of ToF distance measurements can reduce the level of ambiguity associated with the measurements, which in turn can reduce the size of regions to be searched within a primitive. In one example, the intensity of light associated with a pixel (or a pattern of pixels) within a frame may have an expected distribution (e.g., a Gaussian bell distribution). The systems and techniques can reduce noise within depth maps by fitting light signals corresponding to captured frames to the expected distribution prior to determining ToF distance measurements. In another example, the systems and techniques can reduce noise associated with ambient light and/or multi-path interference by determining ToF distance measurements based on multiple frames (e.g., multiple exposures of the primitive pattern). For instance, the systems and techniques can capture a frame corresponding to ambient light signals (e.g., a frame captured when the structured light emitter is turned off) and subtract the ambient light signals from one or more frames used to determine ToF distance measurements.

Further, the systems and techniques can determine (and then remove) light signals corresponding to multi-path interference based on determining that one or more pixels of a frame include captured light that does not correspond to light points of the primitive pattern. For instance, any light that is not ambient light and that is not coming from the pattern directly will be due to multi-path interference (e.g., reflections of the projected pattern from objects in the scene). The projected pattern can have bright regions and dark regions. The light due to multi-path interference is highly diffused light, at least in part because the multi-path interference based light comes from the glow of surrounding reflections. For instance, if a spotlight is projected on a wall in a room, the entire room will be flooded with light, which includes light that reflects multiple times off of various objects. Because the systems and techniques can rely on relative brightness to perform the ToF measurements, the multi-path interference based light can affect the ToF measurement. For instance, the multi-path interference based light can make sharp corners appear to bend in a resulting depth map (e.g., in the depth axis in the point-cloud).

In the event a diffused light is used (e.g., a floodlight illuminator), the multi-path interference blends with the direct light, in some cases such that it is intractable to separate the multi-path interference based light from the direct light. The systems and techniques described herein utilize a structured light source (which has dark regions between light points). By using a structured light source, the multi-path interference can be measured in the dark regions. For instance, the system can measure multi-path interference on the expected dark regions of the pattern of a frame (e.g., obtained using the ToF sensor), resulting in a sparse measurement of the multi-path interference based light. To generate a full map of the scene, the system can perform an interpolation using the sparse multi-path interference measurements. For instance, the system can interpolate across the sparse multi-path interference measurements, providing the system with an accurate representation of the multi-path interference across the entire frame received by the ToF sensor, including the contribution of the multi-path interference on the bright areas of the projected pattern. The system can subtract the multi-path interference from the pattern of the frame. Subtracting the multi-path interference can improve the ToF accuracy of the mixed-mode depth imaging system and can thus reduce the level of ambiguity (and thus the search space) for the structured light computation by the mixed-mode depth imaging system. As described herein, reducing the level of ambiguity (and the search space) can reduce the computational load of the mixed-mode depth imaging system based on reducing the region that needs to be searched when performing the structured light computation.

As noted above, structured light systems use dots to build features. The depth resolution (e.g., the width and height of the resulting depth map) of such systems is determined by the number of dots in the projected pattern, rather than the resolution of the captured frame. Using the systems and techniques described herein, because a point of light (a dot) occupies a certain number of pixels (e.g., an arrangement of 4×4 pixels) in the captured frame, the structured light decoded depth map is a fraction of the frame resolution (e.g., the depth map has a quarter of the frame resolution when each dot occupies 4×4 pixels). In one illustrative example where each dot occupies 4×4 pixels, if the frame resolution is 640×480, the depth map will be 160×120. On the other hand, the ToF measurement returns a depth value for every pixel of the frame, in which case the depth-map resolution is equal to the frame resolution.

The reduced depth-map resolution of a structured light system is due to practical reasons rather than a fundamental limitation. For instance, a structured light matching algorithm can be used that returns a depth value for each frame pixel, or at the subpixel level by performing interpolation between pixel locations. In the more general sense of matching features or codewords, there is no need to 'aligning' to dots, in which case the system can match any arbitrary offset. In most applications, it is the high computational cost that makes it impractical to use full resolution depth-map resolution. The mixed mode systems and techniques described herein provides a way to recover the full frame resolution using the more complex structured light decoding process, but at a reduced search space, thus making it practical from a computational and efficiency standpoint.

Furthermore, many ToF systems have a floodlight emitter (e.g., a uniform light source). Some systems use two separate emitters or add a configurable diffuser and capture two frames, including one frame for structured light and one frame for ToF. The systems and techniques described herein can use the structured light source for ToF measurements (instead of using two different emitters). In such cases, using the structured light source for ToF measurements can mean that ToF is not returning a depth value for every frame pixel, since there are regions that are not illuminated (e.g., the areas between dots). The ToF measurements are thus sparse. The sparseness is not a problem using the systems and techniques described herein because, for example, the ToF measurements are used as a guide for the structured light decoding (e.g., matching) process. The structured light system essentially fills in the gaps of the sparse ToF measurements.

As noted above, the systems and techniques can improve the accuracy of ToF distance measurements. For instance, the systems and techniques can take advantage of the areas between dots (e.g., the so-called 'dark' regions of the frame) to measure the multi-path interference that affects the accuracy of ToF, which can be subtracted from the measurement. Such a solution may not be possible with a floodlight based ToF system.

The systems and techniques also provide inherently higher Signal-to-Noise Ratio (SNR). For instance, because the systems and techniques use a structured light emitter, and perform ToF at the dots, the contrast is higher than a typical ToF system (e.g., using a floodlight) for the same emitter power. A result is that the system can perform better under interference (e.g., outdoors in direct sunlight) and in high absorption regions, compared to same powered floodlight.

Further details regarding mixed-mode depth imaging systems are provided herein with respect to various figures. As will be explained in more detail with respect to the figures, the disclosed mixed-mode depth imaging systems can include all or a portion of a structured light depth imaging system and/or a ToF depth imaging system.

FIG. 1 is a diagram illustrating an example of a mixed mode depth imaging system 100 that can implement the mixed mode depth imaging techniques described herein. Additionally or alternatively, a mixed-mode depth imaging system can include all or a portion of the example depth imaging system 400 for structured light signal processing illustrated in FIG. 4, which is described in more detail below.

As shown in FIG. 1, the mixed mode depth imaging system 100 can include a time-of-flight (ToF) sensor system 102, an image sensor 104, a storage 106, and an application processor 110. In some examples, the depth imaging system 100 can optionally include other compute components 108 such as, for example, a central processing unit (CPU), a graphics processing unit (GPU), a digital signal processor (DSP), and/or an image signal processor (ISP), which the depth imaging system 100 can use to perform one or more of the operations/functionalities described herein with respect to the application processor 110. In some cases, the application processor 110 and/or the other compute components 108 can implement a ToF engine 130, an image processing engine 134, and/or a rendering engine 136.

It should be noted that, in some examples, the application processor 110 and/or the other compute components 108 can also implement one or more computing engines that are not shown in FIG. 1. The ToF engine 130, the image processing engine 134, and the rendering engine 136 are provided herein for illustration and explanation purposes and other possible computing engines are not shown for the sake of simplicity. Also, for illustration and explanation purposes, the ToF engine 130, the image processing engine 134, the rendering engine 136, and their various operations disclosed operations will be described herein as being implemented by the application processor 110. However, one of skill in the art will recognize that, in other examples, the ToF engine 130, the image processing engine 134, the rendering engine 136, and/or their various operations disclosed operations can be implemented by the other compute components 108.

The depth imaging system 100 can be part of, or implemented by, a computing device or multiple computing devices. In some examples, the depth imaging system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a television, a display device, a digital media player, a gaming console, a video streaming device, a head-mounted display (HMD), an extended reality (XR) device, a drone, a computer in a car, an IoT (Internet-of-Things) device, a smart wearable device, or any other suitable electronic device(s). In some implementations, the ToF sensor system 102, the image sensor 104, the storage 106, the other compute components 108, the application processor 110, the ToF engine 130, the image processing engine 134, and the rendering engine 136 can be part of the same computing device.

For example, in some cases, the ToF sensor system 102, the image sensor 104, the storage 106, the other compute components 108, the application processor 110, the ToF engine 130, the image processing engine 134, and the rendering engine 136 can be integrated into a camera, smartphone, laptop, tablet computer, smart wearable device, HMD, XR device, IoT device, gaming system, and/or any other computing device. However, in some implementations, one or more of the ToF sensor system 102, the image sensor 104, the storage 106, the other compute components 108, the application processor 110, the ToF engine 130, the image processing engine 134, and/or the rendering engine 136 can be part of, or implemented by, two or more separate computing devices.

The ToF sensor system 102 can use light, such as near infrared light (NIR), to determine depth and/or distance information about a target (e.g., a surrounding/nearby scene, one or more surrounding/nearby objects, etc.). In some examples, the ToF sensor system 102 can measure both the distance and intensity of each pixel in a target such as a scene. The ToF sensor system 102 can include a light emitter to emit a light signal towards a target (e.g., a scene, an object, etc.), which can hit the target and return/reflect to the ToF sensor system 102. The ToF sensor system 102 can include a sensor to detect and/or measure the returned/reflected light, which can then be used to determine depth and/or distance information for the target. The distance of the target relative to the ToF sensor system 102 can be used to perform depth mapping. The distance of the target can be calculated through direct ToF or indirect ToF.

In direct ToF, the distance can be calculated based on the travel time of the emitted light pulse signal and the returned/reflected light pulse signal (e.g., the time from when the light signal was emitted and the returned/reflected light signal was received). For example, the round-trip distance of the emitted light signal and the returned/reflected light signal can be calculated by multiplying the travel time of the emitted light pulse signal and the returned/reflected light pulse signal by the speed of light, commonly denoted c. The round-trip distance calculated can then be divided by 2 to determine the distance from the ToF sensor system 102 to the target.

In indirect ToF, the distance can be calculated by sending modulated light toward a target and measuring the phase of the returned/reflected light. Knowing the frequency (f) of the emitted light, the phase shift of the returned/reflected light, and the speed of light allows the distance to the target to be calculated. For example, runtime differences between the path of the emitted light and the path of the returned/reflected light result in a phase shift of the returned/reflected light. The phase difference between the emitted light and the returned/reflected light and the modulation frequency (f) of the light can be used to calculate the distance between the ToF sensor system 102 and the target. For example, the formula for the distance between the ToF sensor system 102 and the target can be $c/2f \times \text{Phase Shift}/2\pi$. As this shows, a higher frequency of light can provide a higher measurement accuracy but will result in a shorter maximum distance that can be measured.

Accordingly, in some examples, dual frequencies can be used to improve the measuring accuracy and/or distance, as further explained herein. For example, a 60 MHz light signal can be used to measure a target 2.5 meters away, and a 100 MHz light signal can be used to measure a target 1.5 meters away. In a dual frequency scenario, both the 60 MHz and the 100 MHz light signals can be used to calculate a target 7.5 meters away.

The image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 104 can be part of a camera or computing device such as a digital camera, a video camera, an IP camera, a smartphone, a smart television, a game system, etc. In some examples, the image sensor 104 can include multiple image sensors, such as rear and front sensor devices, and can be part of a dual-camera or other multi-camera assembly (e.g., including two camera, three cameras, four cameras, or other number of cameras). The image sensor 104 can capture image and/or video frames (e.g., raw image and/or video data), which can then be processed by the application processor 110, the ToF engine 130, the image processing engine 134, and/or the rendering engine 136, as further described herein.

The storage 106 can be any storage device(s) for storing data. Moreover, the storage 106 can store data from any of the components of the depth imaging system 100. For example, the storage 106 can store data from the ToF sensor system 102 (e.g., ToF sensor data or measurements), the image sensor 104 (e.g., frames, videos, etc.), data from and/or used by the other compute components 108 and/or the application processor 110 (e.g., processing parameters, image data, ToF measurements, depth maps, tuning parameters, processing outputs, software, files, settings, etc.), data from and/or used by the ToF engine 130 (e.g., one or more neural networks, image data, tuning parameters, auxiliary metadata, ToF sensor data, ToF measurements, depth maps, training datasets, etc.), image processing engine 134 (e.g., image processing data and/or parameters, etc.), data from and/or used by the rendering engine 136 (e.g., output frames), an operating system of the depth imaging system 100, software of the depth imaging system 100, and/or any other type of data.

The application processor 110 can include, for example and without limitation, a CPU 112, a GPU 114, a DSP 116, and/or an ISP 118, which the application processor 110 can use to perform various compute operations such as image/video processing, ToF signal processing, graphics rendering, machine learning, data processing, calculations, and/or any other operations. In the example shown in FIG. 1, the application processor 110 implements a ToF engine 130, an image processing engine 134, and a rendering engine 136. In other examples, the application processor 110 can also implement one or more other processing engines. Moreover, in some cases, the ToF engine 130 can implement one or more machine learning algorithms (e.g., one or more neural networks) configured to perform ToF signal processing and/or generate depth maps.

In some cases, the application processor 110 can also include a memory 122 (e.g., random access memory (RAM), dynamic RAM, etc.) and a cache 120. The memory 122 can include one or more memory devices, and can include any type of memory such as, for example, volatile memory (e.g., RAM, DRAM, SDRAM, DDR, static RAM, etc.), flash memory, flashed-based memory (e.g., solid-state drive), etc. In some examples, the memory 122 can include one or more DDR (e.g., DDR, DDR2, DDR3, DDR4, etc.) memory modules. In other examples, the memory 122 can include other types of memory module(s). The memory 122 can be used to store data such as, for example, image data, ToF data, processing parameters (e.g., ToF parameters, tuning parameters, etc.), metadata, and/or any type of data. In some examples, the memory 122 can be used to store data from and/or used by the ToF sensor system 102, the image sensor 104, storage 106, the other compute components 108, the application processor 110, the ToF engine 130, the image processing engine 134, and/or the rendering engine 136.

The cache 120 can include one or more hardware and/or software components that store data so that future requests for that data can be served faster than if stored on the memory 122 or storage 106. For example, the cache 120 can include any type of cache or buffer such as, for example, system cache or L2 cache. The cache 120 can be faster and/or more cost effective than the memory 122 and storage 106. Moreover, the cache 120 can have a lower power and/or operational demand or footprint than the memory 122 and storage 106. Thus, in some cases, the cache 120 can be used to store/buffer and quickly serve certain types of data expected to be processed and/or requested in the future by one or more components (e.g., application processor 110) of the depth imaging system 100, such as image data or ToF data.

In some examples, the operations for the ToF engine 130, the image processing engine 134, and the rendering engine 136 (and any other processing engines) can be implemented by any of the compute components in the application processor 110. In one illustrative example, the operations of the rendering engine 136 can be implemented by the GPU 114, and the operations of the ToF engine 130, the image processing engine 134, and/or one or more other processing engines can be implemented by the CPU 112, the DSP 116, and/or the ISP 118. In some examples, the operations of the ToF engine 130, and the image processing engine 134 can be implemented by the ISP 118. In other examples, the operations of the ToF engine 130, and/or the image processing engine 134 can be implemented by the ISP 118, the CPU 112, the DSP 116, and/or a combination of the ISP 118, the CPU 112, and the DSP 116.

In some cases, the application processor 110 can include other electronic circuits or hardware, computer software, firmware, or any combination thereof, to perform any of the various operations described herein. In some examples, the ISP 118 can receive data (e.g., image data, ToF data, etc.) captured or generated by the ToF sensor system 102 and/or the image sensor 104 and process the data to generate output depth maps and/or frames. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the ISP 118 can implement one or more processing engines (e.g., ToF engine 130, image processing engine 134, etc.) and can perform ToF signal processing and/or image processing operations, such as depth calculation, depth mapping, filtering, demosaicing, scaling, color correction, color conversion, noise reduction filtering, spatial filtering, artifact correction, etc. The ISP 118 can process data from the ToF sensor system 102, the image sensor 104, storage 106, memory 122, cache 120, other components in the application processor 110, and/or data received from a remote source, such as a remote camera, a server or a content provider.

While the depth imaging system 100 is shown to include certain components, one of ordinary skill will appreciate that the depth imaging system 100 can include more or fewer components than those shown in FIG. 1. For example, the depth imaging system 100 can also include, in some instances, one or more other memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the depth imaging system 100 is described below with respect to FIG. 11.

Figure 2A:
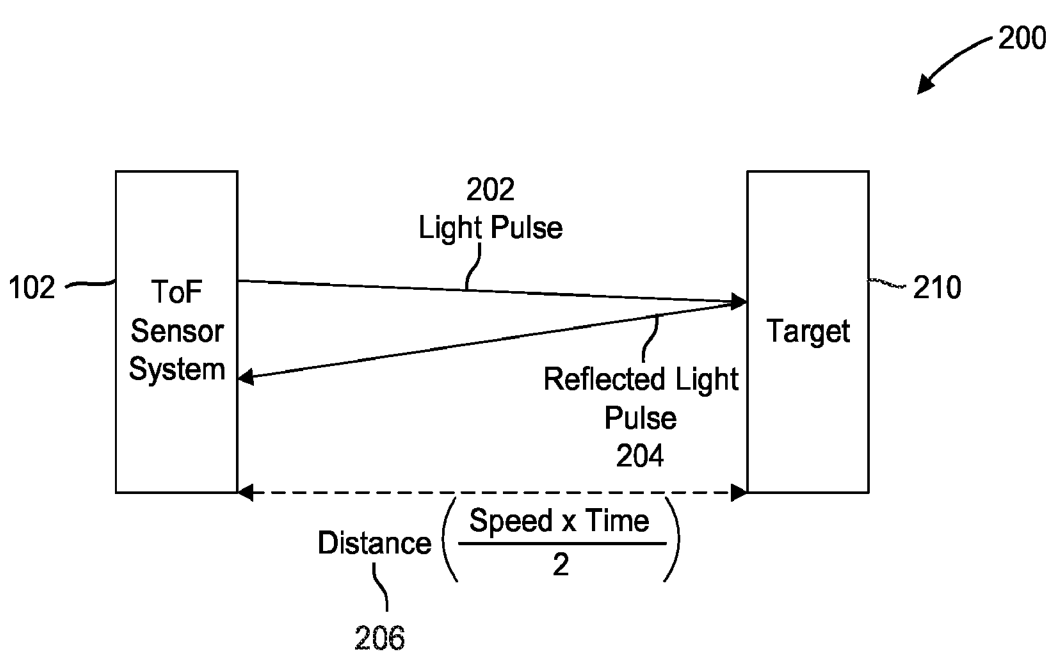
FIG. 2A is a simplified block diagram illustrating an example of a direct ToF sensing procedure, in accordance with some examples of the present disclosure.

FIG. 2A is a simplified block diagram illustrating an example of a direct ToF sensing procedure 200. In the example of FIG. 2A, the ToF sensor system 102 first emits light pulse 202 towards a target 210. The target 210 can include, for example, a scene, one or more objects, one or more animals, one or more people, etc. The light pulse 202 can travel to the target 210 until it hits the target 210. When the light pulse 202 hits the target 210, at least some portion of the light pulse 202 can be reflected back to the ToF sensor system 102.

The ToF sensor system 102 can receive reflected light pulse 204 including at least some portion of the light pulse 202 reflected back from the target 210. The ToF sensor system 102 can sense the reflected light pulse 204 and calculate the distance 206 to the target 210 based on the reflected light pulse 204. To calculate the distance 206, the ToF sensor system 102 can calculate the total time traveled by the emitted light pulse 202 and the reflected light pulse 204 (e.g., the time from when the light pulse 202 was emitted to when the reflected light pulse 204 was received). The ToF sensor system 102 can multiply the total time traveled by the emitted light pulse 202 and the reflected light pulse 204 by the speed of light (c) to determine the total distance traveled by the light pulse 202 and the reflected light pulse 204 (e.g., the round trip time). The ToF sensor system 102 can then divide the total time traveled by 2 to obtain the distance 206 from the ToF sensor system 102 to the target 210.

Figure 2B:
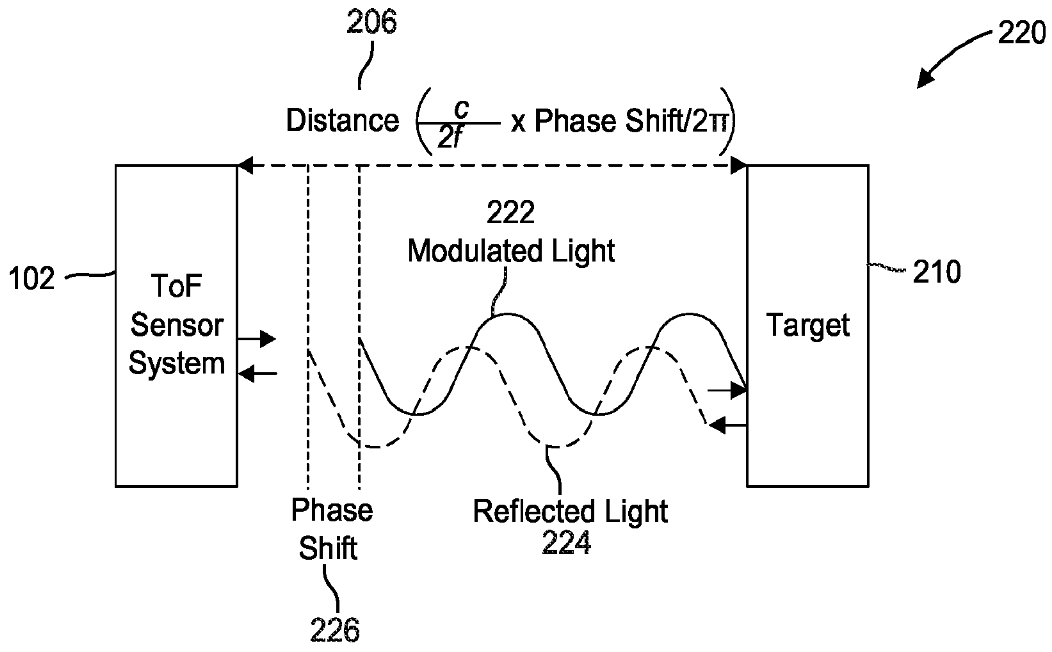
FIG. 2B is a simplified block diagram illustrating an example of an indirect ToF sensing procedure, in accordance with some examples of the present disclosure.

FIG. 2B is a simplified block diagram illustrating an example of an indirect ToF sensing procedure 220. In this example, the phase shift of reflected light can be calculated to determine depth and distance for the target 210. Here, the ToF sensor system 102 first emits modulated light 222 towards the target 210. The modulated light 222 can have a certain known or predetermined frequency. The modulated light 222 can travel to the target 210 until it hits the target 210. When the modulated light 222 hits the target 210, at least some portion of the modulated light 222 can be reflected back to the ToF sensor system 102.

The ToF sensor system 102 can receive the reflected light 224 and can determine the phase shift 226 of the reflected light 224 and the distance 206 to the target 210 using the following formula:

$$\text{Distance}(206) = c/2f \times \text{Phase Shift}/2\pi,$$

where f is the frequency of the modulated light 222 and c is the speed of light.

In some cases, when calculating depth and distance (e.g., distance 206), one or more factors that affect how the light is reflected can be taken into account or used to tune the calculations. For example, objects and surfaces can have specific characteristics which can cause light to reflect differently. To illustrate, different surfaces can have different indexes of refraction, which can affect how light travels or interfaces with the surfaces and/or the material(s) in the surfaces. Moreover, non-uniformities, such as material irregularities or scattering centers, can cause light to be reflected, refracted, transmitted, or absorbed, and can sometimes cause loss of energy. Thus, when light hits a surface, it can be absorbed, reflected, transmitted, etc. The proportion of light reflected by the surface is called its reflectance. However, the reflectance does not only depend on the surface (e.g., index of refraction, material properties, uniformities or non-uniformities, etc.), but can also depend on the type of light being reflected and the surrounding environment (e.g., temperature, ambient light, water vapor, etc.). Therefore, as further explained below, in some cases, information about the surrounding environment, the type of light, and/or characteristics of the target 210 can be factored in when calculating the distance 206 and/or depth information for the target 210

Figure 3A:
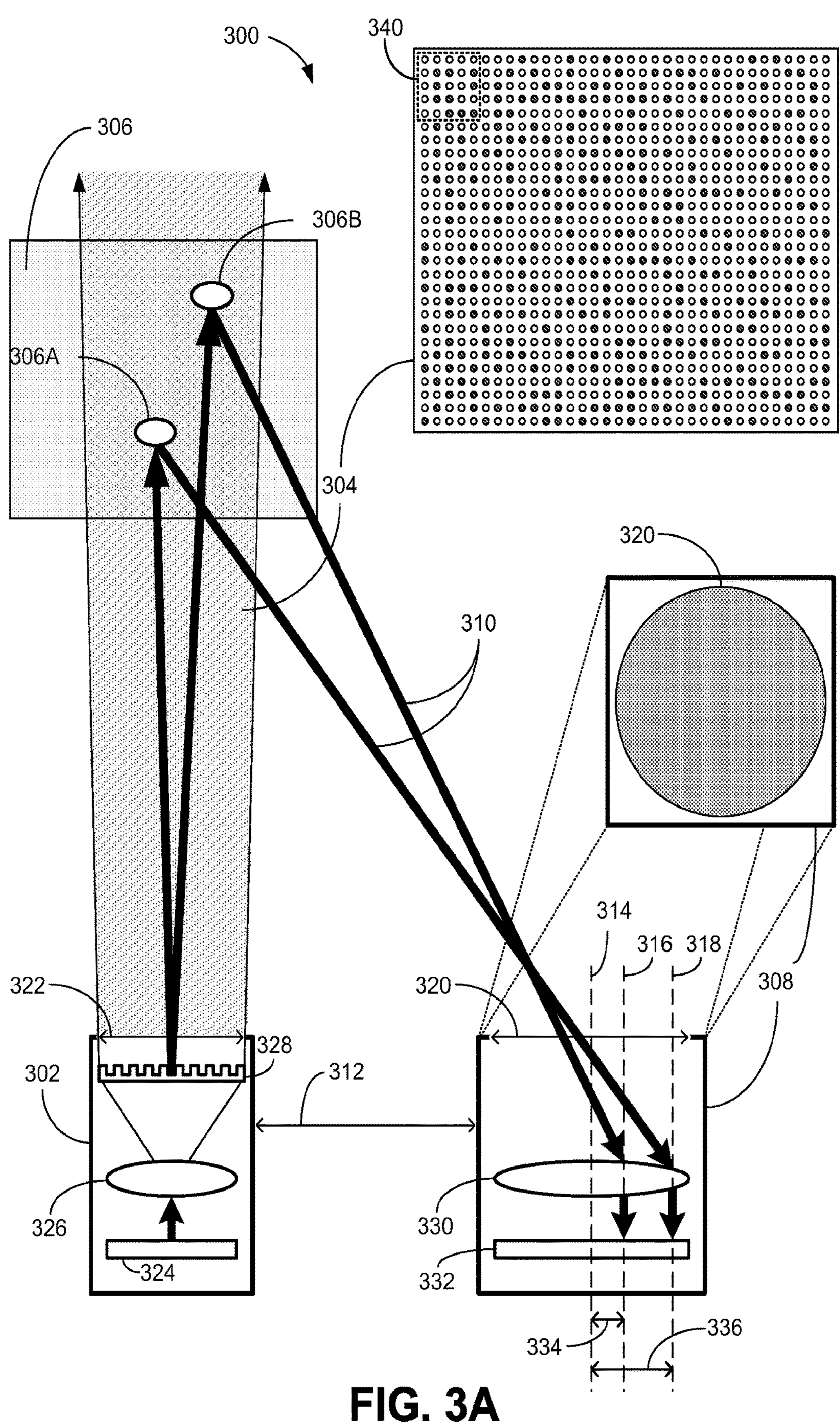
FIG. 3A is a block diagram illustrating an example architecture of a structured light depth imaging system, in accordance with some examples.

FIG. 3A is a depiction of an example depth imaging system 300 configured to use a distribution of light for determining depths of objects 306A and 306B in a scene 306. The depth imaging system 300 may be used to generate a depth map (not pictured) of the scene 306. For example, the scene 306 may include an object (e.g., a face), and the depth imaging system 300 may be used to generate a depth map including a plurality of depth values indicating depths of portions of the object for identifying or authenticating the object (e.g., for face authentication). The depth imaging system 300 includes a projector 302 and a receiver 308. The projector 302 may be referred to as a "structured light source", "transmitter," "emitter," "light source," or other similar term, and should not be limited to a specific transmission component. Throughout the following disclosure, the terms projector, transmitter, and light source may be used interchangeably. The receiver 308 may be referred to as a "detector," "sensor," "sensing element," "photodetector," and so on, and should not be limited to a specific receiving component.

The projector 302 may be configured to project or transmit a distribution 304 of light points onto the scene 306. The white circles in the distribution 304 indicate where no light is projected for a possible point location, and the black circles in the distribution 304 indicate where light is projected for a possible point location. The disclosure may refer to the distribution 304 as a codeword distribution or a pattern, where defined portions of the distribution 304 are codewords (also referred to as codes or features). As used herein, a codeword is a rectangular (such as a square) portion of the distribution 304 of light. For example, a 5×5 codeword 340 is illustrated in the distribution 304. As shown, the codeword 340 includes five rows of possible light points and five columns of possible light points. The distribution 304 may be configured to include an array of codewords. For active depth sensing, the codewords may be unique from one another in the distribution 304. For example, codeword 340 is different than all other codewords in the distribution 304. Further, the location of unique codewords with reference to one another is known. In this manner, one or more codewords in the distribution may be identified in reflections, and the location of the identified codewords with reference to one another, the shape or distortion of the identified codewords with reference to the shape of the transmitted codeword, and the location of the identified codeword on a receiver sensor are used to determine a depth of an object in the scene reflecting the codeword.

The projector 302 includes one or more light sources 324 (such as one or more lasers). In some implementations, the one or more light sources 324 includes a laser array. In one illustrative example, each laser may be a vertical cavity surface emitting laser (VCSEL). In another illustrative example, each laser may include a distributed feedback (DFB) laser. In another illustrative example, the one or more light sources 324 may include a resonant cavity light emitting diodes (RC-LED) array. In some implementations, the projector may also include a lens 326 and a light modulator 328. The projector 302 may also include an aperture 322 from which the transmitted light escapes the projector 302. In some implementations, the projector 302 may further include a diffractive optical element (DOE) to diffract the emissions from one or more light sources 324 into additional emissions. In some aspects, the light modulator 328 (to adjust the intensity of the emission) may include a DOE. In projecting the distribution 304 of light points onto the scene 306, the projector 302 may transmit one or more lasers from the light source 324 through the lens 326 (and/or through a DOE or light modulator 328) and onto objects 306A and 306B in the scene 306. The projector 302 may be positioned on the same reference plane as the receiver 308, and the projector 302 and the receiver 308 may be separated by a distance called the baseline 312.

In some example implementations, the light projected by the projector 302 may be infrared (IR) light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the projector. In the following description, other suitable wavelengths of light may be used. For example, light in portions of the visible light spectrum outside the IR light wavelength range or ultraviolet light may be used.

The scene 306 may include objects at different depths from the structured light system (such as from the projector 302 and the receiver 308). For example, objects 306A and 306B in the scene 306 may be at different depths. The receiver 308 may be configured to receive, from the scene 306, reflections 310 of the transmitted distribution 304 of light points. To receive the reflections 310, the receiver 308 may capture a frame. When capturing the frame, the receiver 308 may receive the reflections 310, as well as (i) other reflections of the distribution 304 of light points from other portions of the scene 306 at different depths and (ii) ambient light. Noise may also exist in the capture.

In some example implementations, the receiver 308 may include a lens 330 to focus or direct the received light (including the reflections 310 from the objects 306A and 306B) on to the sensor 332 of the receiver 308. The receiver 308 also may include an aperture 320. Assuming for the example that only the reflections 310 are received, depths of the objects 306A and 306B may be determined based on the baseline 312, displacement and distortion of the light distribution 304 (such as in codewords) in the reflections 310, and intensities of the reflections 310. For example, the distance 334 along the sensor 332 from location 316 to the center 314 may be used in determining a depth of the object 306B in the scene 306. Similarly, the distance 336 along the sensor 332 from location 318 to the center 314 may be used in determining a depth of the object 306A in the scene 306. The distance along the sensor 332 may be measured in terms of number of pixels of the sensor 332 or a unit of distance (such as millimeters).

In some example implementations, the sensor 332 may include an array of photodiodes (such as avalanche photodiodes) for capturing a frame. To capture the frame, each photodiode in the array may capture the light that hits the photodiode and may provide a value indicating the intensity of the light (a capture value). The frame therefore may be an array of capture values provided by the array of photodiodes.

In addition or alternative to the sensor 332 including an array of photodiodes, the sensor 332 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 332 may include at least a number of pixels equal to the number of possible light points in the distribution 304. For example, the array of photodiodes or the CMOS sensor may include at least a number of photodiodes or a number of pixels, respectively, corresponding to the number of possible light points in the distribution 304. The sensor 332 logically may be divided into groups of pixels or photodiodes that correspond to a size of a bit of a codeword (such as 4×4 groups for a 4×4 codeword). The group of pixels or photodiodes also may be referred to as a bit, and the portion of the captured data from a bit of the sensor 332 also may be referred to as a bit. In some example implementations, the sensor 332 may include at least the same number of bits as the distribution 304. If the light source 324 transmits IR light (such as NIR light at a wavelength of, e.g., 940 nanometers (nm)), the sensor 332 may be an IR sensor to receive the reflections of the NIR light.

As illustrated, the distance 334 (corresponding to the reflections 310 from the object 306B) is less than the distance 336 (corresponding to the reflections 310 from the object 306A). Using triangulation based on the baseline 312 and the distances 334 and 336, the differing depths of objects 306A and 306B in the scene 306 may be determined in generating a depth map of the scene 306. Determining the depths may further be based on a displacement or a distortion of the distribution 304 in the reflections 310.

In some implementations, the projector 302 is configured to project a fixed light distribution, in which case the same distribution of light is used in every instance for active depth sensing. In some implementations, the projector 302 is configured to project a different distribution of light at different times. For example, the projector 302 may be configured to project a first distribution of light at a first time and project a second distribution of light at a second time. A resulting depth map of one or more objects in a scene is thus based on one or more reflections of the first distribution of light and one or more reflections of the second distribution of light. The codewords between the distributions of light may differ, and the depth imaging system 300 may be able to identify a codeword in the second distribution of light corresponding to a position in the first distribution of light for which the codeword could not be identified. In this manner, more valid depth values may be generated in generating the depth map without reducing the resolution of the depth map (such as by increasing the size of the codewords).

Although a number of separate components are illustrated in FIG. 3A, one or more of the components may be implemented together or include additional functionality. All described components may not be required for a depth imaging system 300, or the functionality of components may be separated into separate components. Additional components not illustrated also may exist. For example, the receiver 308 may include a bandpass filter to allow signals having a determined range of wavelengths to pass onto the sensor 332 (thus filtering out signals with a wavelength outside of the range). In this manner, some incidental signals (such as ambient light) may be prevented from being received as interference during the captures by the sensor 332. The range of the bandpass filter may be centered at the transmission wavelength for the projector 302. For example, if the projector 302 is configured to transmit NIR light with a wavelength of 940 nm, the receiver 308 may include a bandpass filter configured to allow NIR light having wavelengths within a range of, e.g., 920 nm to 960 nm. Therefore, the examples described regarding FIG. 3A is for illustrative purposes.

Figure 3B:
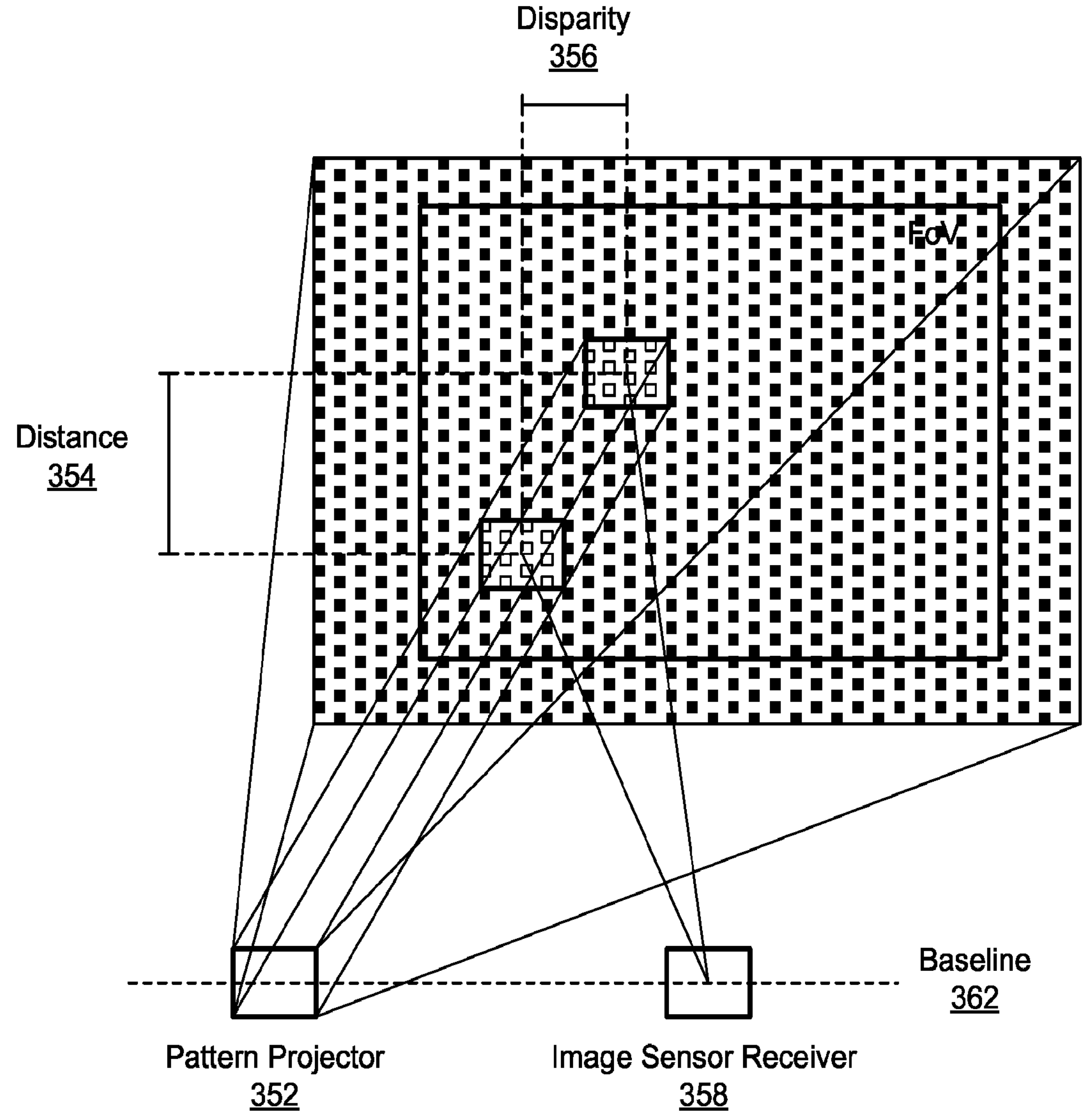
FIG. 3B is a diagram illustrating an example of a disparity caused by parallax between an image sensor receiver and a pattern projector, in accordance with some examples.

Structured light depth imaging systems can rely on measuring the 'disparity' (a shift of pixels along one axis) caused by the parallax between an image sensor receiver (e.g., the receiver 308) and a pattern projected into a scene (e.g., by a projector, such as projector 302). FIG. 3B is a diagram illustrating an example of determining a disparity 356 caused by parallax between an image sensor receiver 358 and a pattern projector 352. In general, the closer an object is to the image sensor receiver 358, the larger the shift of pixels (and thus the disparity 356). Depth is the distance of a point from the receiver 358. Depth is inversely proportional to the shift represented by the disparity 356. Such a phenomenon is similar to stereo vision, where two views are compared to each other (e.g. left and right eye) to deduce depth. One difference is that, in the structured-light case, one of the 'views' is a known reference pattern (the projection).

The act of measuring the disparity 356 can include identifying each unique part of the projected pattern at the image sensor receiver 358 (referred to as decoding). The structured light depth imaging system can then measure the perceived shift along a baseline 362 (the horizontal axis, which can be similar to the baseline 312 in FIG. 3A) due to parallax, taking into account that the disparity at infinity is 0. In some cases, the projected pattern may not be unique across the Field of View (FoV) of the structured light depth imaging system, in which case the disparity measurement will wrap-around. This determines the closest distance (e.g., distance 354) the structured light depth imaging system can infer. In some cases, the uniqueness that is relevant to the structured light depth imaging system is uniqueness along the baseline, in which case the projected pattern can repeat, with some small margin, in the orthogonal (vertical) direction, without interfering with the above measurement.

Figure 3C:
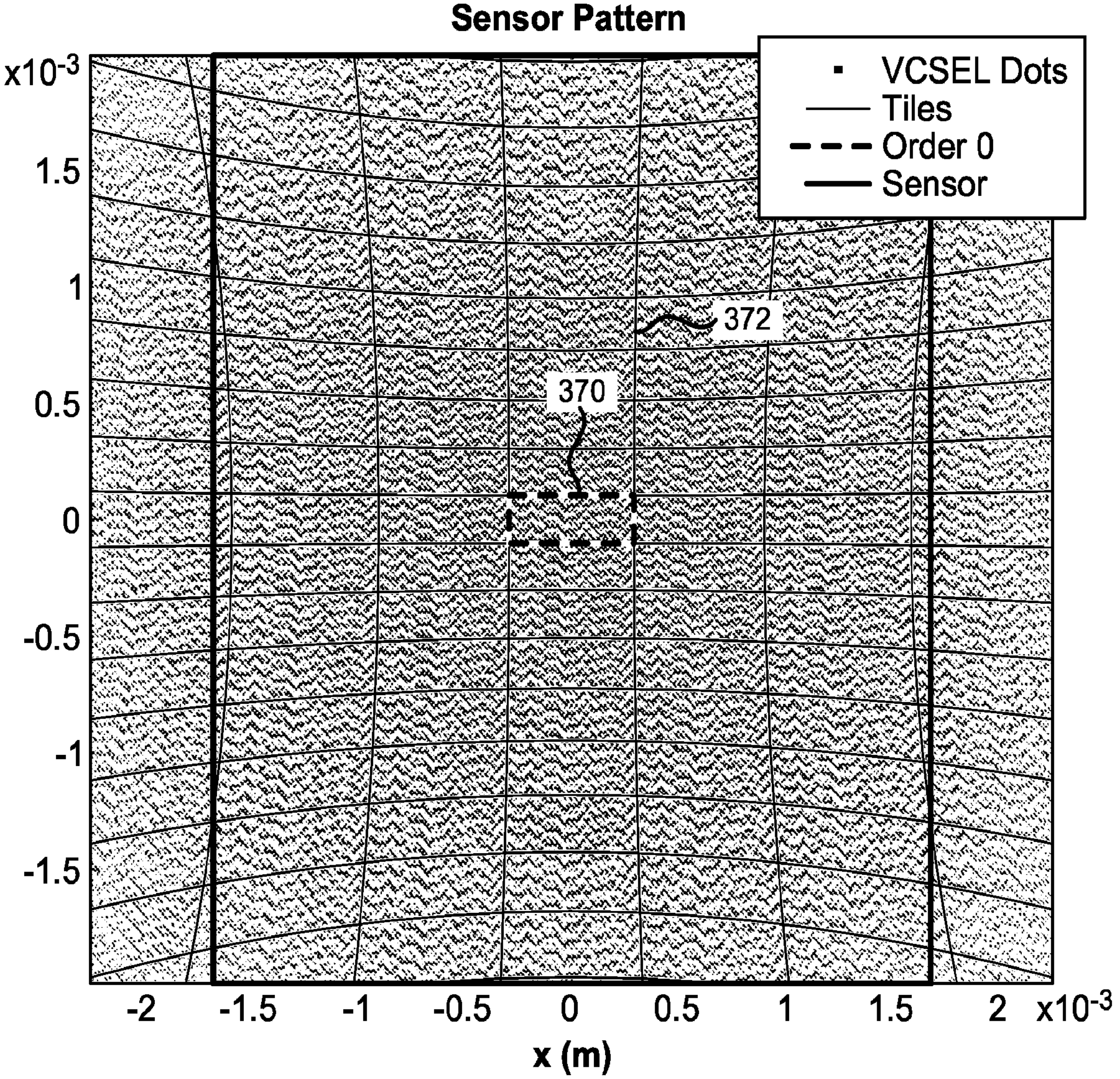
FIG. 3C is a diagram illustrating an example of a projected vertical-cavity surface-emitting laser (VCSEL) primitive replicated by a diffractive optical element (DOE), in accordance with some examples.
Figure 3D:
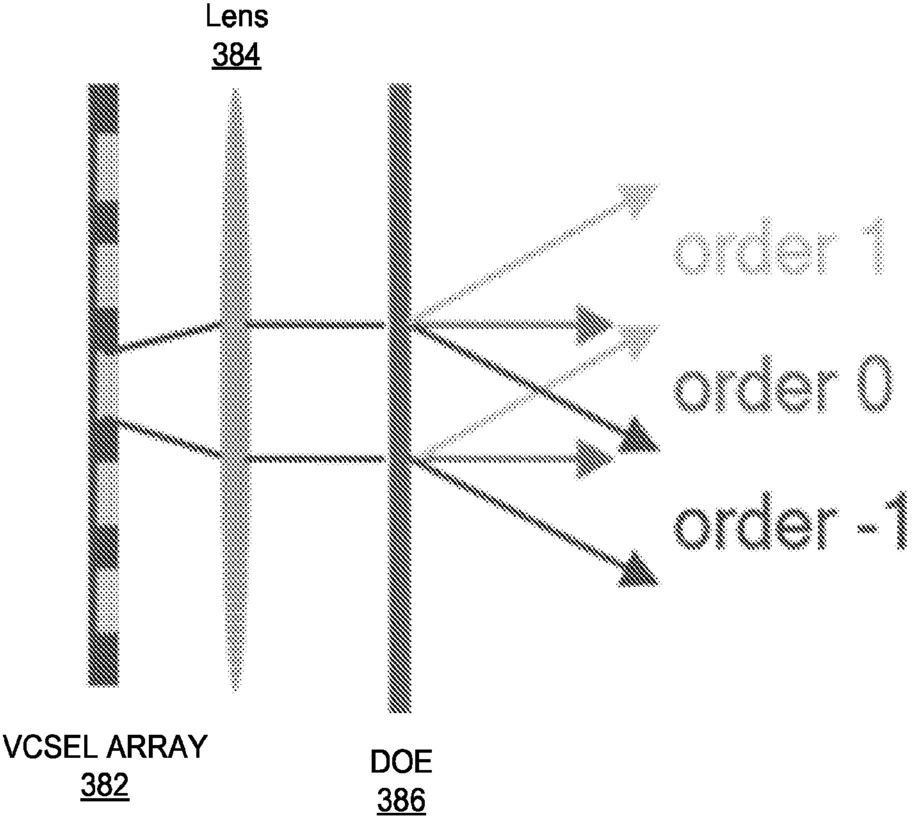
FIG. 3D is a diagram illustrating a depth imaging system including a DOE placed in front of a VCSEL array and a lens, in accordance with some examples.

A structured light projector can take many forms, with various types of projected patterns. As noted above, an example of a structured light projector is a Vertical Cavity Surface Emitting Laser (VCSEL) array, which emits a coded pattern of on or off laser dots. The primitive pattern of the VCSEL array can be optically replicated (or tessellated) into a projected scene, by using a Diffraction Optical Element (DOE), as noted above, forming M×N tiles. An example of a projected VCSEL primitive replicated by a DOE is shown in FIG. 3C. The VCSEL array primitive 370 is shown in the middle (Order 0) highlighted by a box. Each blue dot represents a VCSEL laser dot. In the example of FIG. 3C, the primitive 370 array is replicated into diffracted orders +8/−8×+3/−3 tiles or 17×7, shown as various tiles (e.g., tile 372). The replication is performed by a DOE that is placed in front of the VCSEL array. For instance, as shown in FIG. 3D, a DOE 386 is placed in front of a VCSEL array 382 and a lens 384.

Figure 4:
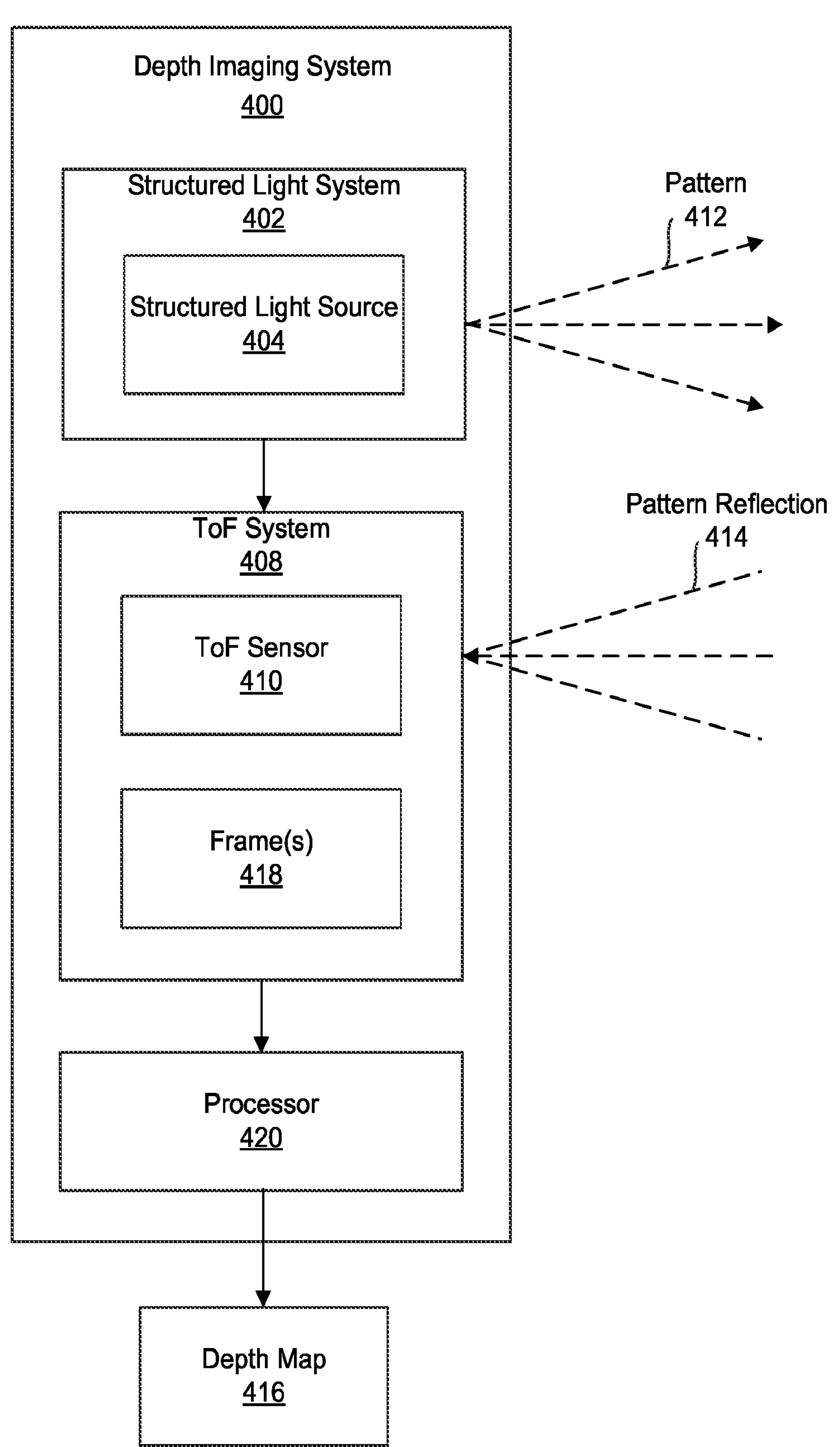
FIG. 4 is a block diagram illustrating an example architecture of a mixed-mode depth imaging system, in accordance with some examples.

FIG. 4 is a block diagram illustrating an example of a depth imaging system 400 for mixed-mode depth imaging. In some examples, the depth imaging system 400 can be implemented by and/or include all or a portion of the depth imaging system 100 of FIG. 1 and/or the depth imaging system 300 of FIG. 3A. For example, the depth imaging system 400 can include a structured light system 402, which includes a structured light source 404. In one example, the structured light source 404 can correspond to the projector 302 of the depth imaging system 300. In an illustrative example, the structured light source 404 can include a VCSEL array and a DOE configured to diffract and project light emitted by the VCSEL array. As shown, the structured light source 404 can be configured to emit a pattern 412 of light (e.g., corresponding to the distribution 304 emitted by the projector 302). For instance, the structured light source 404 can project the pattern 412 to illuminate a scene. In some cases, the pattern 412 can correspond to a primitive pattern that the structured light source 404 tessellates (e.g., repeats). In one example, the primitive pattern can include a plurality of uniquely identifiable features (e.g., codewords) that each correspond to two or more light points. Each light point can correspond to two or more pixels (e.g., when captured by a ToF sensor 410 of the depth imaging system 400). In one example, the ToF sensor 410 can correspond to the image sensor 104 of the depth imaging system 100. In some cases, the ToF sensor 410 can be configured to receive, capture, and/or process incident light. For instance, the ToF sensor 410 can capture a pattern reflection 414, which corresponds to light of the pattern 412 that is reflected and/or returned to the ToF sensor 410. In one example, the ToF sensor 410 can generate one or more frame(s) 418 corresponding to the pattern reflection 414. As will be explained in more detail below, a processor 420 of the depth imaging system 400 can process and/or analyze the frame(s) 418 to generate a depth map 416 of the scene illuminated by the pattern 412.

In some cases, the depth imaging system 400 can include the entire functionality of a ToF depth imaging system (such as the depth imaging system 100) and/or a structured light depth imaging system (such as the depth imaging system 300). For example, although not illustrated in FIG. 4, the depth imaging system 400 can include a projector configured for flood illumination (e.g., to facilitate conventional ToF distance measurements). However, in some cases, the depth imaging system 400 can perform mixed-mode depth imaging using a single light source (e.g., the structured light source 404) and a single image sensor (e.g., the ToF sensor 410), in which case a projector for flood illumination is not used or included in the system 400. For example, the depth imaging system 400 can determine ToF distance measurements for pixels corresponding to light points of the pattern 412 (rather than determining ToF distance measurements for each pixel of the frame 418).

In one example, the depth imaging system 400 can perform a mixed-mode depth imaging process that involves two stages. The process can be performed for all or a portion of the pixels corresponding to light points of the frame(s) 418. In some cases, the first stage of the process can include determining a ToF distance measurement associated with a pixel. The ToF distance measurement can represent an estimated and/or unrefined distance measurement. The second stage of the process can include using the ToF distance measurement to determine and search within a search space of the primitive. For instance, the search space can correspond to a subset of the primitive (e.g., a subset of features from the set of uniquely identifiable features in the primitive) in which case a "feature" corresponding to the pixel of the frame(s) 418 is located (e.g., expected and/or likely to be located). As used herein, "searching" a search space of a primitive can include comparing image data within a region surrounding a pixel of a frame with image data within regions having the same size or a reduced size within the search space of the primitive. For example, in some cases as noted above, a dot in the primitive can occupy a certain number of pixels in a captured frame (e.g., one dot can occupy 4×4 pixels in a frame). In such an example where one dot occupies 4×4 pixels, a 4×4 region of the primitive can be searched for a 16×16 arrangment of pixels from the captured frame. Once the depth imaging system 400 identifies a region of the primitive corresponding to the region of the frame, the depth imaging system 400 can determine a structured light distance measurement associated with the frame pixel (e.g., based on a displacement between the region of the frame and the region of the primitive). In some cases, the structured light distance measurement can represent a precise and/or refined distance measurement. The depth imaging system 400 can incorporate the structured light distance measurement into the depth map 416.

The depth imaging system 400 can determine ToF distance measurements using various types of ToF sensing processes and/or technologies. In an illustrative example, the depth imaging system 400 can implement an amplitude-based ToF process, which involves determining a ratio between the light amplitudes corresponding to one pixel within two or more exposures of a frame (referred to herein as "frame exposures"). The distance is based on a second exposure of a second image being delayed relative to a first exposure of a first image (e.g., the ratio between brightness of the two exposures is proportional to the distance). In some cases, the frame exposures are generated using different levels of illumination (e.g., different levels of light intensity). For example, the structured light system 402 can generate a first frame F1 having a first exposure by projecting the pattern 412 (e.g., using the structured light source 404) with a first level of illumination with a light illumination of a certain duration t. The first frame F1 corresponds to the light that is measured during this duration t by the ToF sensor 410. The structured light system 402 can then generate a second frame F2 having a second exposure by measuring the light coming to the sensor for a duration between t and 2t. The ToF distance measurement associated with one pixel can correspond to the ratio F1/(F1+F2) of the light amplitudes associated with the pixel in both frame exposures. In some embodiments, a third frame F3 can be measured without any illumination to capture the background illumination due to external light sources, such as lights or the sun. The ToF distance can finally be measured as (F1−F3)/(F1+F2−2F3)*c*t, where c is the speed of light.

FIG. 5A illustrates a first frame 502 and a second frame 504 corresponding to examples of frame exposures generated by conventional amplitude-based ToF systems (e.g., ToF systems that use floodlight illumination). In this example, the first frame 502 has a first frame exposure corresponding to a high level of brightness and the second frame 504 has a second frame exposure corresponding to a low level of brightness. As shown, each pixel of the first frame 502 and the second frame 504 correspond to reflected light (e.g., due to the frame exposures being generated using floodlight illumination). The two exposures of the first frame 502 and the second frame 504 are of a same duration, based on the same pulse of light propagating through the scene. The two exposures are separated in time, one after the other. What makes the frames 502 and 504 appear to have different brightnesses is how much of the returning light the sensor captures for each of the frames 502 and 504. The first exposure (e.g., corresponding to duration t noted above) of the first frame 502 begins almost immediately after the light pulse is emitted. If no objects are nearby to reflect the light back, the exposure will appear dark, because the duration is short enough to avoid sensing light returning from far away objects. The second exposure of the second frame 504 is delayed (e.g., corresponding to the duration between t and 2t noted above), the sensor will be able to capture light returning from far away objects, which is why the ratio between brightness of the two exposures is proportional to the distance.

FIG. 5B illustrates a first frame 506 having a first exposure and a second frame 508 having a second exposure corresponding to examples of frame exposures generated by the depth imaging system 400. For instance, the depth imaging system 400 can generate the first frame 506 having the first exposure and the second frame 508 having the second exposure by projecting the pattern 412 using different levels of illumination. In this example, the first exposure of the first frame 506 has a first frame exposure corresponding to high level of brightness and the second exposure of the second frame 508 has a second frame exposure corresponding to a low level of brightness. In some cases, the two exposures of the first frame 506 and the second frame 508 are of a same duration, similar to that described above with respect to FIG. 5A. For instance, the structured light system 402 can have one acquisition event (e.g., capture of a frame by the ToF sensor 410 based on a projected pattern) for ToF and structured light. For ToF, the structured light system 402 can apply the above formula of ratios (e.g., F1/(F1+F2) or (F1−F3)/(F1+F2−2F3)*c*t). To compute the structured light depth, the structured light system 402 can add the two exposures of the frames 506 and 508 together, thus recovering most or all of the light of the projected pattern. The structured light system 402 can perform the structured light based pattern matching on the frame having the combined exposure, guided by the search space defined by the ToF depth.

As shown in FIG. 5B, the light points illustrated in the first frame 506 and the second frame 508 correspond to the pattern 412. For instance, because the pattern 412 includes multiple codewords (e.g., uniquely identifiable features composed of multiple points of light), a portion of the pixels of the first frame 506 and the second frame 508 are not associated with reflected light (e.g., light corresponding to the pattern reflection 414). Thus, in some cases, ToF distance measurements may not be available for the pixels not associated with reflected light. FIG. 5C illustrates an example depth map 510 that can be generated based on the first frame 506 having the first exposure and the second frame 508 having the second exposure. In this example, objects with darker shading are associated with shorter depths than objects with lighter shading.

Figure 6A:
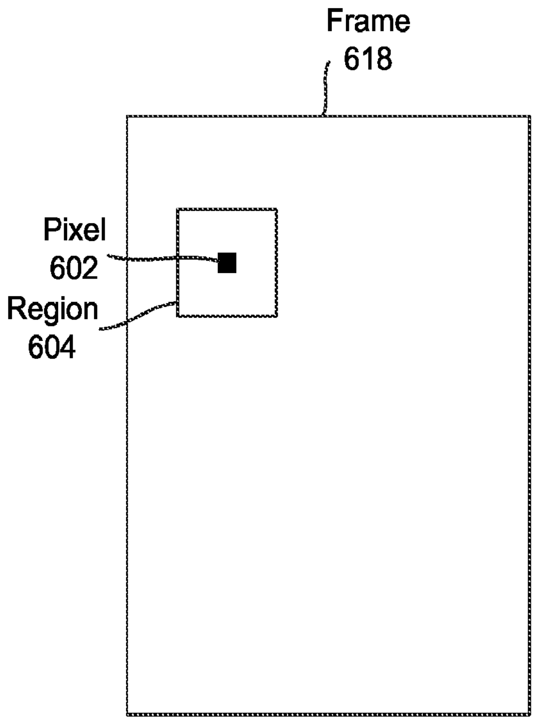
FIG. 6A and FIG. 6B are diagrams illustrating an example process for structured light decoding guided by ToF distance measurements, in accordance with some examples.
Figure 6B:
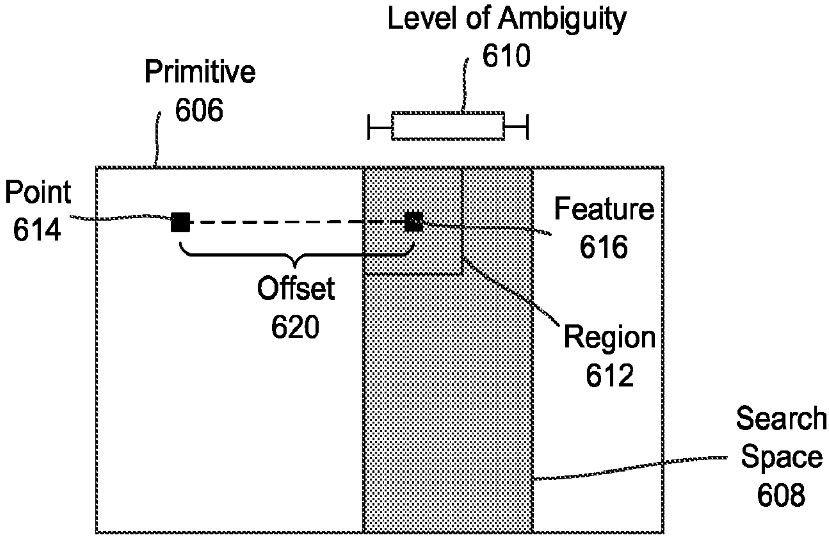

FIG. 6A and FIG. 6B illustrate an example of using a ToF distance measurement to determine and search a search space of a primitive. For example, FIG. 6A shows a pixel 602 within a frame 618 (e.g., corresponding to the frame(s)

418 of FIG. 4). In one example, the depth imaging system 400 can generate the frame 618 based on tessellating and projecting a primitive 606 into a space and receiving reflected light at a sensor (e.g., at the ToF sensor 410). In such an example, a feature defined by the pixel 602 and one or more other pixels in the frame 618 is associated with a light point of the primitive 606. The depth imaging system 400 can determine a ToF distance measurement corresponding to the pixel 602. The depth imaging system 400 can use the ToF distance measurement to determine a feature within the primitive 606 (e.g., feature 616) that corresponds to the feature defined by the pixel 602 and the one or more other pixels in the frame 618. For example, the depth imaging system 400 can use the ToF distance measurement to determine a search space 608 of the primitive 606 in which the feature 616 within the primitive 606 corresponding to the pixel 602 is likely and/or expected to be located.

In some cases, a structured light depth imaging system can determine that a primitive feature corresponds to a frame pixel based on determining a region (e.g., a block of pixels) surrounding the frame pixel and searching the primitive for a corresponding region. In one example, the corresponding region can be a region that includes feature(s) (or codeword (s)) that correspond to the region of pixels surrounding the frame pixel. Accordingly, the region can be of any suitable size such that the region includes one or more features (or codewords). In an illustrative example, the region of the primitive can include a 4×4 arrangement of dots (making up a feature or codeword) that corresponds to a 16×16 block of pixels encompassing the frame pixel. In other examples, the region can correspond to a 4×4 block of pixels, an 8×8 block of pixels, an 8×16 block of pixels, etc. In some cases, the structured light depth imaging system can determine whether a region of the primitive corresponds to the region of the frame by comparing primitive data (e.g., features or codewords) in the region of the primitive to image data in the region of the frame. For example, the structured light depth imaging system can determine that the region of the primitive (e.g., a feature or codeword including a 4×4 arrangement of dots) corresponds to the region of the frame (e.g., a 16×16 region of pixels) based on determining that data within the regions exceeds a similarity threshold. In another example, the structured light depth imaging system can determine that the region of the primitive corresponds to the region of the frame based on determining that the region of the primitive is the most similar to the region of the frame (e.g., within the entire primitive). In an illustrative example, the structured light depth imaging system can determine the similarity between primitive data of a region of the primitive and image data of the region of the frame based on a convolutional operation, as described below. Other techniques for determining the similarity between data of two regions include block-matching techniques, normalized-cross-correlation techniques, match-filter techniques, among other techniques.

In some examples, a conventional structured light depth imaging system (e.g., a structured light depth imaging system that does not incorporate ToF technology) can determine a feature (or codeword) within the primitive that corresponds to a feature defined by a frame pixel based on searching the entirety of the primitive. For example, given a region of the frame having a particular size, the conventional structured light depth imaging system can compare the region of the frame with each distinct region (of the same size) within the primitive. In some cases, searching the entirety of the primitive may be necessary to obtain an accurate distance measurement (e.g., to identify the correct corresponding region). In contrast, the disclosed mixed-mode depth imaging systems and techniques can use an initial ToF distance measurement to determine a search space that is a subset of the primitive. For example, the depth imaging system 400 can identify the corresponding dots of the primitive within the search space (without searching areas of the primitive outside the search space). In this way, the depth imaging system 400 can implement a mixed-mode depth imaging process that incorporates both ToF techniques and structured light techniques. Because determining the ToF distance measurement can involve significantly less time and/or processing power than searching the entirety of the primitive, the mixed-mode depth imaging process can improve the efficiency of conventional structured light systems (while maintaining the same accuracy and/or precision).

Returning to FIG. 6B, the depth imaging system 400 can determine a search space 608 based on the ToF distance measurement associated with the pixel 602. In some cases, the search space 608 can be defined at least in part by an offset 620. As shown, the offset 620 extends between a central vertical axis of the search space 608 and a point 614. In some cases, as shown in FIG. 6B, the point 614 and the center of the feature 616 are on the same row (aligned in the horizontal plane), based on the emitter (e.g., the structured light source 404) and the sensor (e.g., the ToF sensor 410) being placed on the same horizontal plane (in which case, the parallax should only cause a horizontal displacement). The point 614 is at a location in the primitive 606 that corresponds to a location of the pixel 602 within the frame 618. Thus, the offset 620 can be used to define the horizontal position of the search space 608 within the primitive 606. In some cases, the offset 620 can represent an estimation of the displacement (also referred to as disparity) between the pixel 602 and the feature 616 (see FIG. 3A, FIG. 3B, and the corresponding description for further discussion of displacements as used in structured light systems). In one example, the depth imaging system 400 can determine the magnitude of the offset 620 based on the ToF distance measurement associated with the pixel 602. For example, the magnitude of the offset 620 can be inversely proportional to the ToF distance measurement. In a structured light system, nearby objects within a scene are associated with higher displacements than far away objects. Thus, the depth imaging system 400 can determine relatively high offset values for pixels associated with low ToF distance measurements, and determine relatively low offset values for pixels associated with high ToF distance measurements. For instance, structured light distance (SL distance) can be determined as:

$$SL\ \text{distance} = \text{focal length} \times \frac{\text{baseline}}{\text{displacement}}.$$

The displacement is also referred to as disparity and can be expressed in pixel units. As noted above, the offset 620 is an example of the displacement (or disparity). An example of the baseline is shown as the baseline 312 in FIG. 3A and 362 in FIG. 3B. An example of determining depth based on the displacement (or disparity or offset) is described above with respect to FIG. 3B.

As shown in FIG. 6B, the search space 608 can also be defined at least in part by a level of ambiguity 610. In some cases, the level of ambiguity 610 can correspond to a level of ambiguity of the ToF distance measurement. For instance, as mentioned above, ToF sensors can have inherent limitations that degrade the precision of ToF distance measurements. While ToF depth imaging systems can be faster and/or generate higher-resolution depth maps than structured light depth imaging systems, ToF distance measurements can often be less accurate than structured light distance measurements. Thus, the depth imaging system 400 can determine the level of ambiguity 610 based on an expected amount of error associated with ToF distance measurements determined using the ToF system 408. For instance, the depth imaging system 400 can determine that the ToF system 408 is expected to calculate ToF distance measurements accurately within a certain range of distance measurements and/or a certain range of error (which can be referred to as an error margin). In some cases, the error margin can be made constant (e.g., based on the intrinsic characteristics of the ToF acquisition system, such as the ToF sensor 410 of FIG. 4). In an illustrative example, the depth imaging system 400 can determine that a distance measurement determined by the ToF system 408 is expected to have an error margin or range of 0.78% (e.g., the correct distance measurement is expected to be within ±0.78% of the determined distance measurement). In this example, the depth imaging system 400 can determine the magnitude of the level of ambiguity 610 based on the error margin of 0.78%. In general, the depth imaging system 400 can determine high levels of ambiguity for ToF distance measurements associated with high error margins, and low levels of ambiguity for ToF distance measurements associated with low error margins. In some examples, the level of ambiguity 610 can be determined based on auto-exposure. For instance, photon-noise (also referred to as shot-noise) is scene dependent, with outdoors making it worse, in which case the level of ambiguity 610 can be linked to auto-exposure.

As shown, the level of ambiguity 610 can be used to define the width (as viewed in FIG. 6B) of the search space 608. In some cases, the height of the search space 608 can correspond to the height of the primitive 606. In other cases, the height of the search space 608 can be less than the height of the primitive 606 (e.g., half the height of the primitive 606, one-third the height of the primitive 606, etc.). In an illustrative example, the primitive 606 may have a height of 64 dots and a width of 124 dots, a region 612 may have a height of 16 dots and a width of 16 dots, and the search space 608 may have a height of 64 dots and a width of 20 dots (e.g., as defined by the level of ambiguity 610). The depth imaging system 400 can determine search spaces of any suitable size based on the size of the primitive 606, the magnitude of the offset 620, and/or the magnitude of the level of ambiguity 610.

After defining the search space 608, the depth imaging system 400 can search the search space 608 to identify the feature including the corresponding feature 616. For instance, FIG. 6B illustrates the region 612 at a first location within the search space 608. The depth imaging system 400 can determine (e.g., based on a convolutional operation) whether primitive data associated with the dots within the region 612 at the first location corresponds to image data within the region 604. In one example, if the depth imaging system 400 determines that the primitive data within the region 612 corresponds to the image data within the region 604, the depth imaging system 400 can determine that a feature within the region 612 corresponds to the pixel 602. For example, the depth imaging system 400 can determine that the corresponding feature (e.g., the feature 616) is at a location within the region 612 that corresponds to the location of the pixel 602 within the region 604. The depth imaging system 400 can then determine a structured light distance measurement associated with the pixel 602 based on determining a displacement between the point 614 and the feature 616. In other examples, if the depth imaging system 400 determines that the primitive data within the region 612 does not correspond to the image data within the region 604, the depth imaging system 400 can move the region 612 to a second location within the search space 608. For instance, the depth imaging system 400 can "slide" the region 612 one dot or feature horizontally or vertically (e.g., up or down as viewed in FIG. 6B). The depth imaging system 400 can then compare primitive data within the region 612 at the second location with the image data of the region 604. In some examples, the depth imaging system 400 can continue this process of analyzing primitive data at various locations within the search space 608 until the feature in the primitive 606 corresponding to the pixel 602 is identified (or until analyzing each possible location for the region 612). Using such a technique, the depth imaging system 400 can identify the feature in the primitive 606 corresponding to the pixel 602 without analyzing data of the primitive 606 outside the search space 608. For example, analyzing primitive data outside the search space 608 may be unnecessary when performing the mixed mode techniques described herein.

In some cases, the depth imaging system 400 can incorporate the structured light distance measurement associated with the pixel 602 into the depth map 416. Further, the depth imaging system 400 can repeat the process of determining structured light distance measurements based on initial ToF distance measurements for all or a portion of the additional pixels of the frame 618 that are associated with light points of the pattern 412. By using ToF distance measurements as a "guide" for structured light decoding, the disclosed depth imaging systems can increase the efficiency of structured light decoding without sacrificing accuracy.

The disclosed mixed mode depth imaging systems can implement one or more techniques and/or processes to further improve the quality of generated depth maps. In one example, using a structured light source to obtain ToF distance measurements can improve the accuracy of the ToF distance measurements. For example, the light points projected by a structured light source (such as the structured light source 404 of the depth imaging system 400) may generally have a greater intensity than the floodlight illumination used by conventional ToF systems. Because the pattern 412 includes dark regions (e.g., regions not associated with light points), the light points may be composed of more focused and/or concentrated light signals. Thus, the light signals in the frame(s) 418 may have a greater signal-to-noise ratio (SNR) than light captured by conventional ToF systems. The greater SNR can enable more precise ToF distance measurements.

Further, in some examples, the depth imaging system 400 can reduce the effects of multipath interference (MPI) and/or ambient light in the frame(s) 418. For example, MPI can occur when an emitted light signal returns to a sensor by two or more distinct paths, which can obfuscate emitted light signals that return to a sensor after being reflected by a single object. Ambient light signals are another source of obfuscation. In some cases, the depth imaging system 400 can determine (and then eliminate or reduce) MPI signals and/or ambient light signals within the frame(s) 418. To determine ambient light signals, the depth imaging system 400 can capture a frame exposure without projecting light from the structured light source 404. This frame exposure may represent a third frame exposure (in addition to the frame exposures corresponding to low and high levels of illumination, as illustrated in FIG. 5A and FIG. 5B). In some cases, the depth imaging system 400 can subtract the light signals in the third frame exposure from the light signals in the other two exposures before determining ToF distance measurements based on the other two exposures. In this way, the depth imaging system 400 can eliminate or reduce noise from ambient light signals within the ToF distance measurements.

Figure 7A:
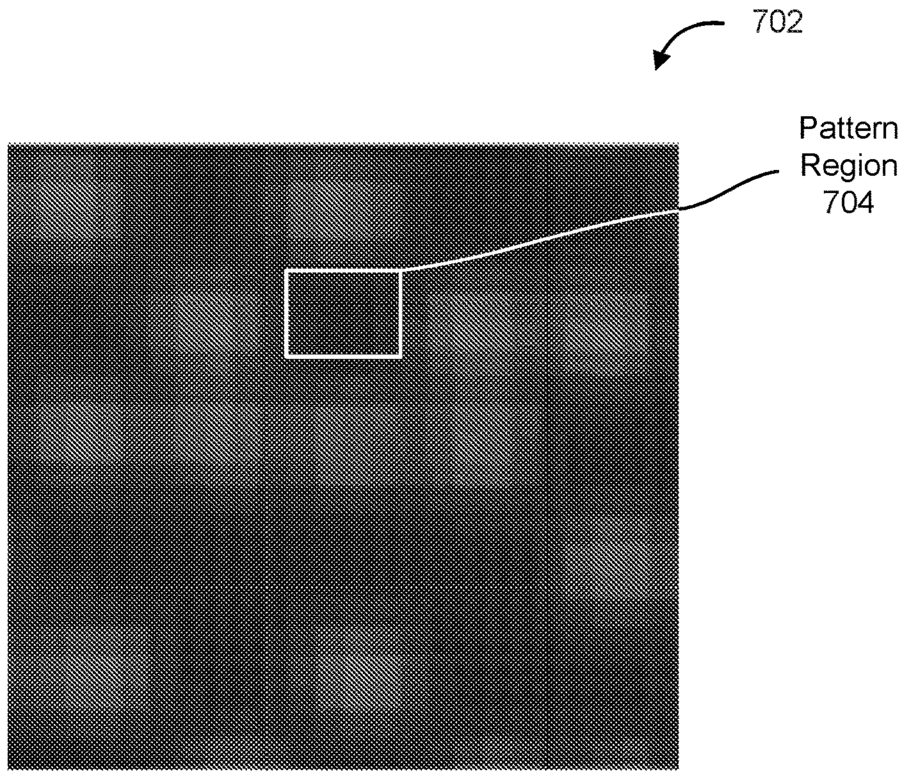
FIG. 7A and FIG. 7B illustrate example frame exposures with reduced signal noise, in accordance with some examples.
Figure 7B:
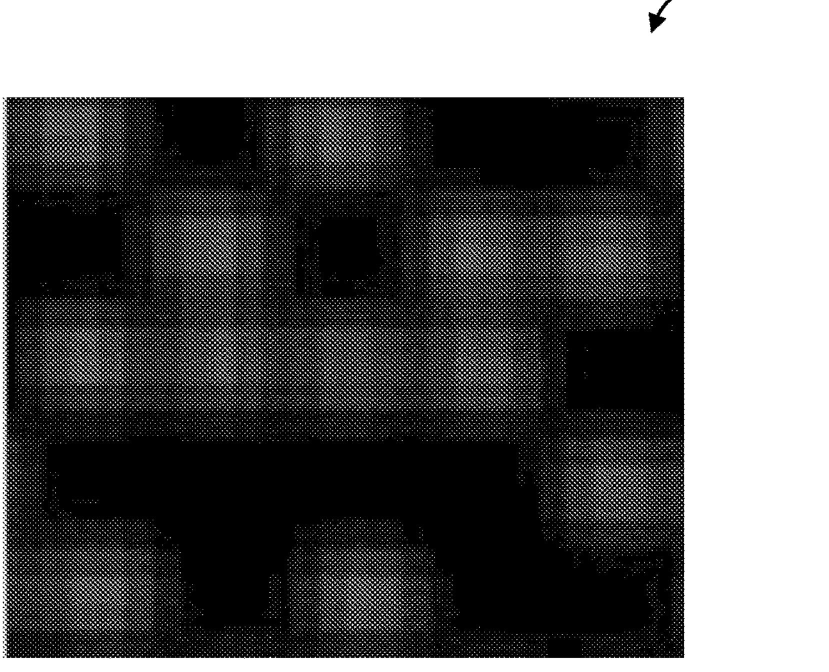

Further, in some examples, the amplitude of MPI signals within the frame exposures corresponding to low and high levels of illumination can differ. For example, a high level of illumination can disproportionately introduce MPI signals into a frame exposure (e.g., relative to the MPI signals introduced by a low level of illumination). Because the depth imaging system 400 can be configured to determine ToF distance measurements based on a ratio of light amplitudes within the two frame exposures, it can be beneficial to eliminate or reduce MPI signals within both frame exposures. In one example, the depth imaging system 400 can eliminate or reduce MPI signals within a frame exposure by determining light signals within regions of the frame exposure not associated with light points of the pattern 412 (referred to as dark regions of the pattern 412). The depth imaging system 400 can then subtract the determined light signals from other regions of the frame exposure, resulting in subtraction of the estimated MPI. FIG. 7A illustrates an example frame exposure 702 that includes MPI signals. In this example, the depth imaging system 400 has subtracted ambient light signals from the frame exposure. Thus, light signals within a pattern region 704 (e.g., a dark region of the frame exposure 702 not associated with light points of the pattern 412) correspond to MPI signals (and not other light signals). The depth imaging system 400 can determine the amplitude (e.g., the average amplitude) of the light signals within the pattern region 704 and can subtract the amplitude of the light signals from other regions of the frame exposure 702. For example, the depth imaging system 400 can subtract the light signals from all or a portion of the light points of the frame exposure 702. FIG. 7B illustrates a frame exposure 706 corresponding to the frame exposure 702 after the depth imaging system 400 eliminates or reduces MPI signals from the frame exposure 702 by subtracting the MPI from the frame exposure 702. As shown, the light points of the frame exposure 706 are more defined (e.g., less noisy) than the light points within the frame exposure 702. In some cases, reducing or eliminating MPI signals and/or ambient light signals from frame exposures can improve the accuracy of ToF distance measurements and/or structured light distance measurements.

Figure 8:
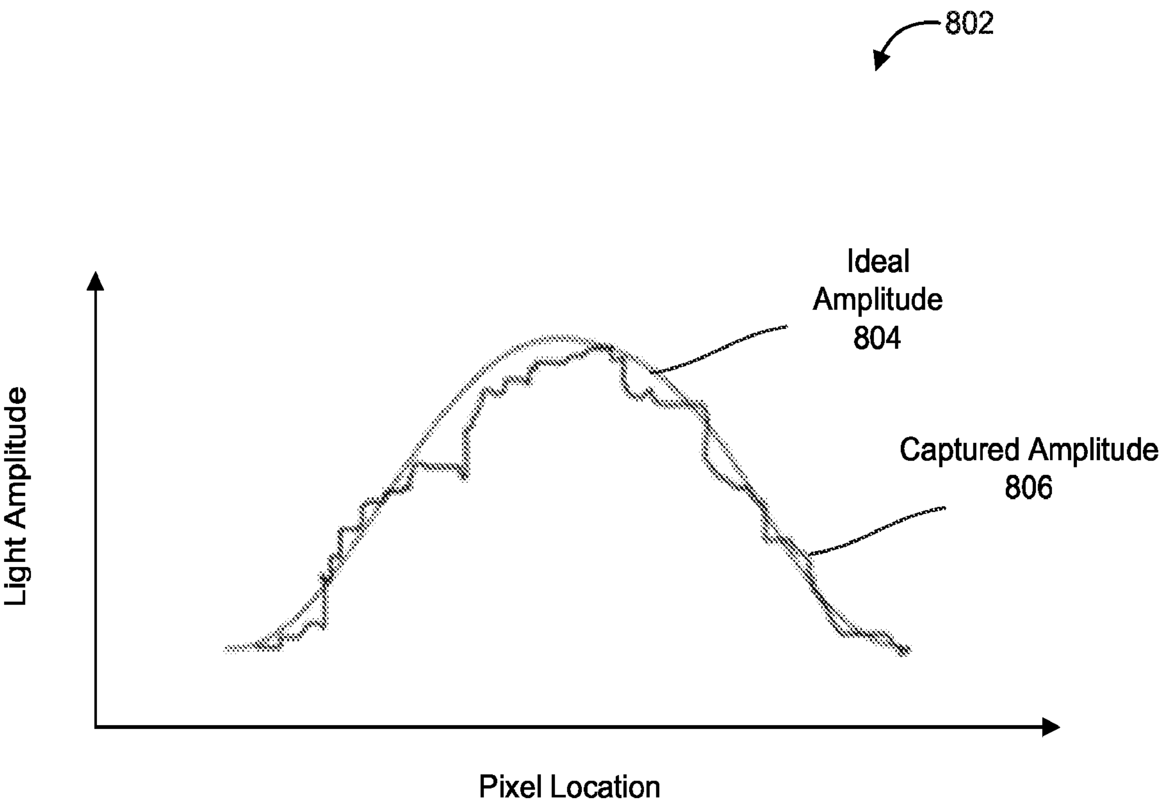
FIG. 8 is an example of a plot of captured and ideal amplitudes of light received by a sensor, in accordance with some examples.

In some cases, the depth imaging system 400 can perform one or more additional or alternative operations to reduce noise within the frame(s) 418. For example, the light amplitude of a light point within the frame(s) 418 can be described and/or approximated by a Gaussian function (e.g., a Gaussian bell curve) or similar function. In some cases, noise within captured light signals can cause the light amplitude to deviate from an ideal Gaussian function. FIG. 8 illustrates an example plot 802 that shows a captured amplitude 806 corresponding to the amplitude of a captured light signal. Plot 802 also shows an ideal amplitude 804 generated based on fitting the captured amplitude 806 to a Gaussian function. In some cases, the depth imaging system 400 can fit all or a portion of the captured light signals of the frame(s) 418 to an ideal Gaussian function before determining ToF distance measurements associated with the signals. Further, in one example, the depth imaging system 400 can determine functions corresponding to various codewords associated with the frame(s) 418. For example, the depth imaging system 400 can use the patterns of the codewords as signals for de-noising. In some cases, fitting the captured light signals to functions corresponding to codewords (which can be an ideal function) can further reduce noise within the frame(s) 418. These processes of fitting light signals to functions (e.g., ideal functions) can improve the noise characteristics of the ToF distance measurements, which can result in a smaller level of ambiguity associated with the ToF distance measurements (and therefore a smaller search space for structured light decoding).

Figure 9A:
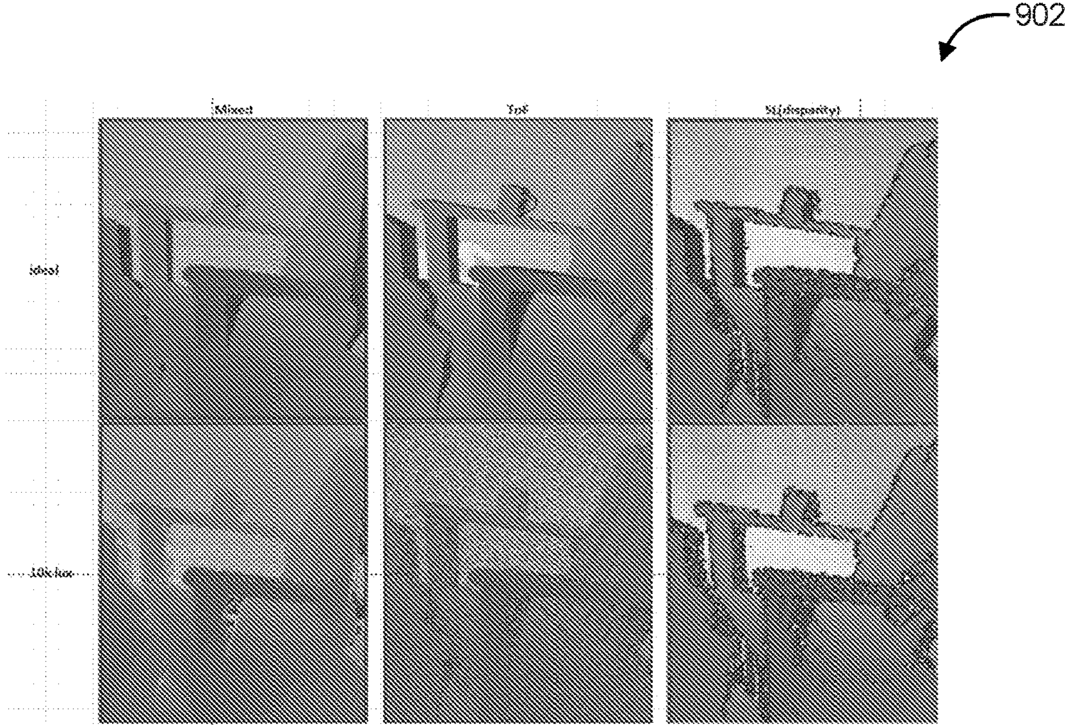
FIG. 9A and FIG. 9B are examples of depth maps generated by various depth imaging systems, in accordance with some examples.
Figure 9B:
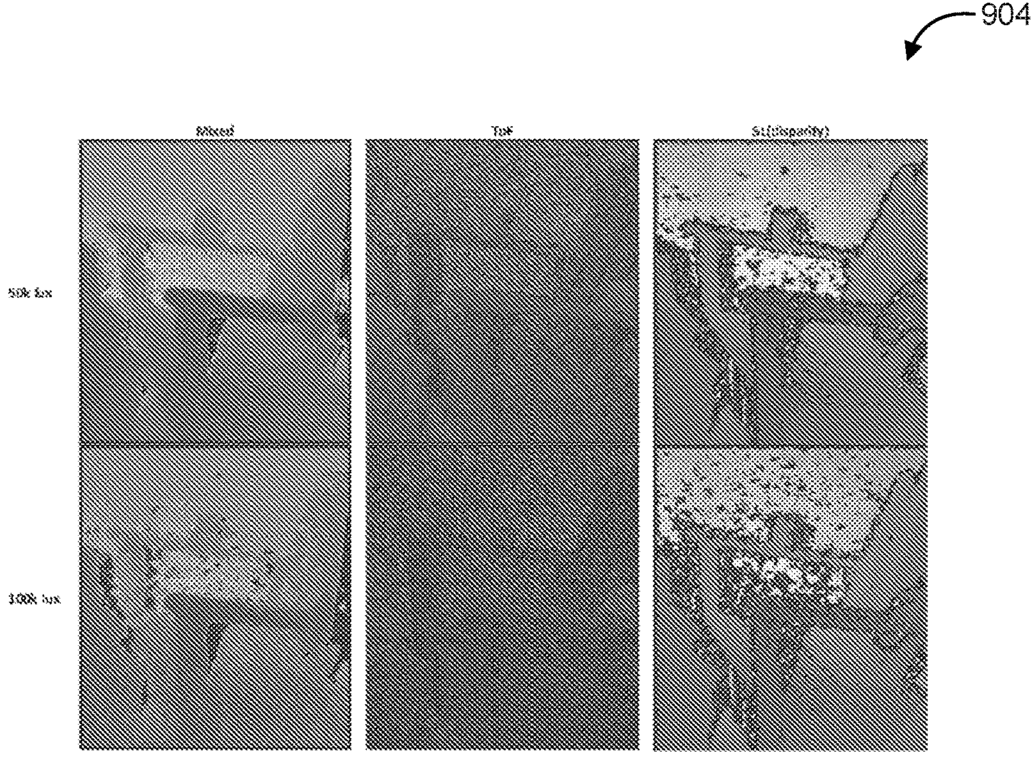

FIG. 9A illustrates an example of a depth map 902 and FIG. 9B illustrates an example of a depth map 904. The depth maps 902 and 904 demonstrate the advantages of the disclosed mixed-mode depth imaging systems. For instance, the depth maps 902 and 904 represent mixed-mode depth maps, ToF depth maps, and structured light depth maps generated under various conditions of ambient light. The conditions of ambient light include ideal conditions (e.g., no ambient light), ambient light of 10,000 lumens, ambient light of 50,000 lumens, and ambient light of 100,000 lumens. As shown, the mixed-mode depth maps generated under each condition of ambient light are generally higher quality (e.g., more accurate) than the ToF depth maps and the structured light depth maps.

FIG. 10 is a flow diagram illustrating an example of a process 1000 of generating one or more depth maps using the techniques described herein. At block 1002, the process 1000 includes obtaining a frame including a reflected pattern of light generated based on a pattern of light emitted by a structured light source (e.g., the pattern 412 of light emitted by the structured light source 404). The pattern of light is based on a primitive that includes a set of uniquely identifiable features (or codewords), as described herein. In some aspects, the pattern of light emitted by the structured light source includes a plurality of light points (e.g., corresponding to the primitive pattern). In some aspects, a feature within the set of uniquely identifiable features of the primitive includes two or more light points of the plurality of light points. In some cases, a light point of the primitive corresponds to two or more pixels of the frame. For instance, each light point (or dot) can correspond to an arrangement of 4×4, 8×8, or other arrangement of pixels of the frame. In some examples, the structured light source is configured to emit the pattern of light using a diffractive optical element that simultaneously projects a plurality of patterns of light corresponding to the primitive (effectively repeating the primitive, such as that shown in FIG. 3C).

At block 1004, the process 1000 includes determining, using a time-of-flight (ToF) sensor (e.g., ToF sensor 410), a first distance measurement associated with a pixel of the frame. In one illustrative example, the first distance measurement can include the ToF distance measurement described above with respect to FIG. 6A. In some aspects, the process 1000 includes obtaining a first exposure of the frame associated with a first level of illumination (e.g., a first brightness) and obtaining a second exposure of the frame associated with a second level of illumination (e.g., a second brightness) that is different than the first level of illumination. As described above, the first level of illumination (or brightness) can be different from the second level of illumination (or brightness) based on how much of the returning light the sensor captures for each of the frames (e.g., based on how far objects are from which the light is reflected). The process 1000 can include determining the first distance measurement associated with the pixel of the frame based at least in part on a comparison between a first light amplitude associated with the pixel in the first exposure and a second light amplitude associated with the pixel in the second exposure. In some aspects, the process 1000 includes fitting a function to light signals corresponding to the pixel of the frame before determining the first distance measurement associated with the pixel of the frame. Fitting the function to the light signals can improve the noise characteristics of the ToF distance measurements, which can result in a smaller level of ambiguity associated with the ToF distance measurements. A smaller level of ambiguity can result in a smaller search space for structured light decoding, which can allow more efficient feature identification within the primitive.

At block 1006, the process 1000 includes determining, based at least in part on the first distance measurement, a search space within the primitive. The search space includes a subset of features from the set of uniquely identifiable features of the primitive. For instance, the search space can include the search space 608 shown in FIG. 6B. In some cases, the first distance measurement includes a range of distance measurements. The process 1000 can include determining a size of the search space within the primitive based at least in part on the range of distance measurements. For instance, a large range of distance measurements can be associated with a large size of the search space. In some cases, the process 1000 can include determining the range of distance measurements based at least in part on a level of ambiguity (e.g., the level of ambiguity 610 shown in FIG. 6B) associated with the ToF sensor. For instance, a high level of ambiguity is associated with a large range of distance measurements.

In some aspects, the process 1000 includes determining, based at least in part on the first distance measurement, an offset between a first location of the pixel of the frame and a second location of the feature of the primitive. In one illustrative example, the offset can include the offset 620 shown in FIG. 6B. In some cases, the offset is inversely proportional to the first distance measurement. The process 1000 can include determining the search space within the primitive based at least in part on the offset. In some cases, the process 1000 includes setting a central axis of the search space within the primitive as the second location of the feature of the primitive.

The process 1000 can include searching the search space within the primitive. At block 1008, the process 1000 includes determining, based on searching the search space within the primitive, a feature of the primitive corresponding to a region around the pixel of the frame. In one illustrative example, each feature includes a 4×4 arrangement of dots and each dot corresponds to a 4×4 arrangement of pixels, resulting in a feature occupying 16×16 pixels in a captured frame when each dot occupies 4×4 pixels. In such an example, the region around the pixel of the frame can include a 16×16 region of pixels around the pixel of the frame, and the primitive can be searched on a 4×4 dot basis (thus searching each feature in the primitive).

At block 1010, the process 1000 includes determining a second distance measurement associated with the pixel of the frame based at least in part on determining the feature of the primitive from the search space within the primitive. In some cases, the second distance measurement can include a disparity value (e.g., disparity 356 shown in FIG. 3B). At block 1012, the process 1000 includes generating a depth map based at least in part on the second distance measurement. For instance, as noted above, depth is inversely proportional to a shift represented by the disparity (or second distance measurement).

In some examples, the region around the pixel of the frame has a predetermined size. In some cases, the process 1000 includes determining the region around the pixel of the frame having the predetermined size. The process 1000 can include determining a first region of the search space within the primitive that has the predetermined size. The process 1000 can search the first region by determining whether image data within the region around the pixel of the frame corresponds to image data (e.g., dots of a primitive) within the first region of the search space. The process 1000 can include determining the image data within the region around the pixel of the frame corresponds to the image data within the first region of the search space. In such cases, the process 1000 can include determining the second distance measurement based at least in part on determining a distance between the pixel of the frame and a corresponding feature of the first region of the search space. In some cases, the process 1000 can include determining the image data within the region around the pixel of the frame does not correspond to the image data within the first region of the search space within the primitive. In such cases, the process 1000 can include determining a second region of the search space. For instance, as described above with respect to FIG. 6B, the depth imaging system 400 can "slide" the region 612 one dot or feature horizontally or vertically (e.g., up or down as viewed in FIG. 6B). The second region of the search space also has the predetermined size. The process 1000 can include determining whether image data within the region around the pixel of the frame corresponds to image data within the second region of the search space.

In some aspects, the process 1000 can include obtaining an additional frame while the structured light source is not emitting the pattern of light based on the primitive. The process 1000 can include determining ambient light signals based at least in part on the additional frame. The process 1000 can include subtracting the ambient light signals from the frame before determining the first distance measurement associated with the pixel of the frame. In some cases, the process 1000 can include determining light signals corresponding to multi-path interference using the frame after subtracting the ambient light signals from the frame. The process 1000 can include and subtracting the light signals corresponding to multi-path interference from the frame before determining the first distance measurement associated with the pixel of the frame. Such aspects can be used in some cases to reduce the effects of multipath interference (MPI) and/or ambient light in one or more frames, as described above.

In some examples, the processes described herein (e.g., process 1000 and/or other process described herein) may be performed by a computing device or apparatus. In some examples, the process 1000 can be performed by the depth imaging system 100 of FIG. 1, the depth imaging system 400 of FIG. 4, and/or the computing system 1100 of FIG. 11. In one example, the process 1000 can be performed by a computing device or system with the architecture of the computing system 1100 shown in FIG. 11. For instance, a computing device with the architecture of the computing system 1100 of FIG. 11 can include the components of the depth imaging system 100 of FIG. 1 and/or the components of the depth imaging system 400 of FIG. 4, and can implement the operations of FIG. 10.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing component or device of a vehicle, a robotic device, a television, and/or any other computing device with the resource capabilities to perform the processes described herein, including the process 1000. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
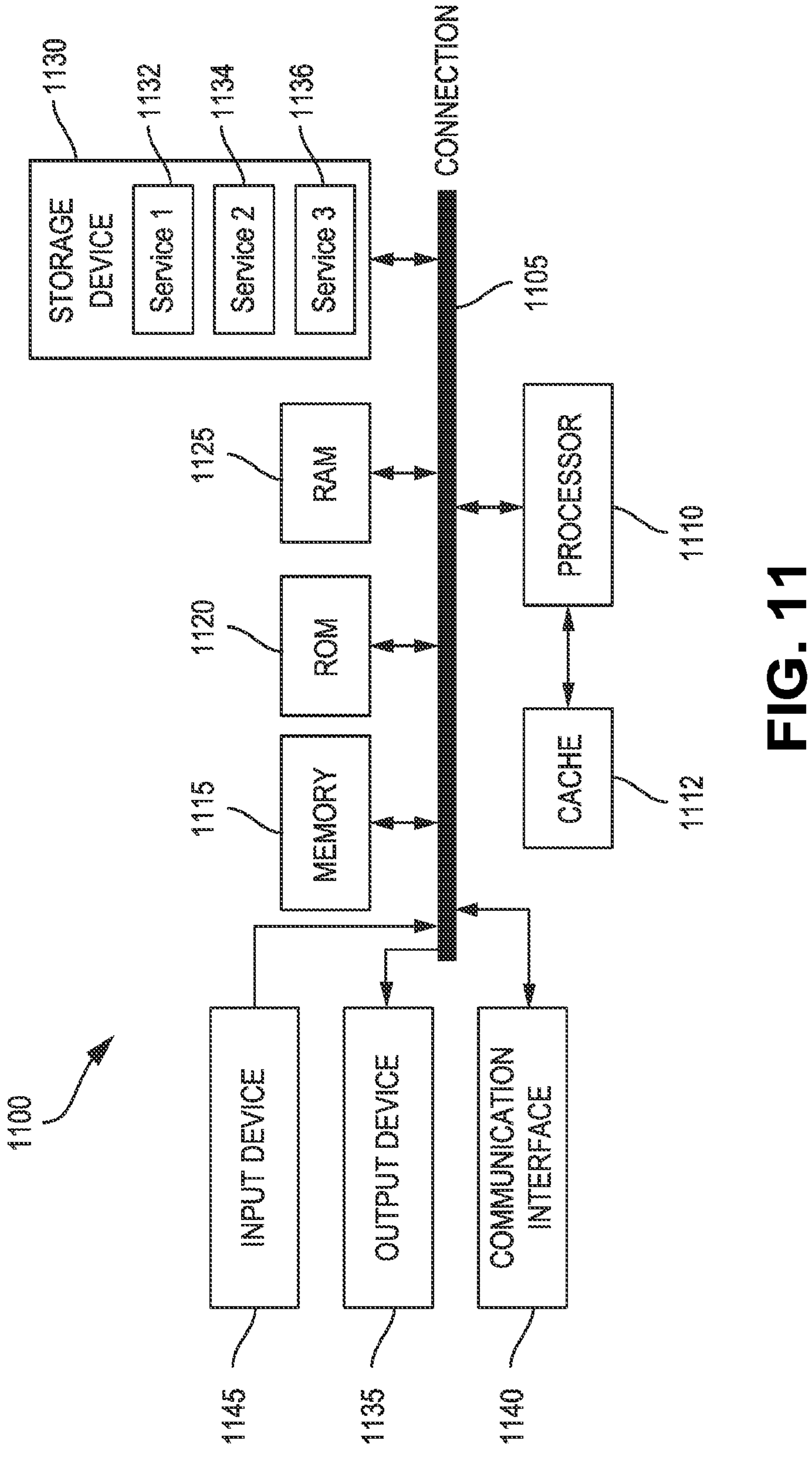
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for generating one or more depth maps, comprising: a structured light source configured to emit a pattern of light based on a primitive, the primitive including a set of uniquely identifiable features; a time-of-flight (ToF) sensor; at least one memory; and one or more processors (e.g., implemented in circuitry) coupled to the at least one memory. The one or more processors configured to: obtain a frame including a reflected pattern of light generated based on the pattern of light emitted by the structured light source; determine, using the ToF sensor, a first distance measurement associated with a pixel of the frame; determine, based at least in part on the first distance measurement, a search space within the primitive, the search space including a subset of features from the set of uniquely identifiable features of the primitive; determine, based on searching the search space within the primitive, a feature of the primitive corresponding to a region around the pixel of the frame; determine a second distance measurement associated with the pixel of the frame based at least in part on determining the feature of the primitive from the search space within the primitive; and generate a depth map based at least in part on the second distance measurement.

Aspect 2: The apparatus of aspect 1, wherein the one or more processors are configured to: obtain a first exposure of the frame associated with a first level of illumination; obtain a second exposure of the frame associated with a second level of illumination that is different than the first level of illumination; and determine the first distance measurement associated with the pixel of the frame based at least in part on a comparison between a first light amplitude associated with the pixel in the first exposure and a second light amplitude associated with the pixel in the second exposure.

Aspect 3: The apparatus of any of aspects 1 or 2, wherein: the first distance measurement includes a range of distance measurements; and the one or more processors are configured to determine a size of the search space within the primitive based at least in part on the range of distance measurements, wherein a large range of distance measurements is associated with a large size of the search space.

Aspect 4: The apparatus of aspect 3, wherein the one or more processors are configured to determine the range of distance measurements based at least in part on a level of ambiguity associated with the ToF sensor, wherein a high level of ambiguity is associated with a large range of distance measurements.

Aspect 5: The apparatus of any of aspects 1 to 4, wherein the one or more processors are configured to: determine, based at least in part on the first distance measurement, an offset between a first location of the pixel of the frame and a second location of the feature of the primitive, wherein the offset is inversely proportional to the first distance measurement; and determine the search space within the primitive based at least in part on the offset.

Aspect 6: The apparatus of aspect 5, wherein the one or more processors are configured to set a central axis of the search space within the primitive as the second location of the feature of the primitive.

Aspect 7: The apparatus of any of aspects 1 to 6, wherein the region around the pixel of the frame has a predetermined size, and wherein the one or more processors are configured to: determine a first region of the search space, the first region of the search space having the predetermined size; and determine whether image data within the region around the pixel of the frame corresponds to image data within the first region of the search space.

Aspect 8: The apparatus of aspect 7, wherein the one or more processors are configured to: determine the image data within the region around the pixel of the frame corresponds to the image data within the first region of the search space; and determine the second distance measurement based at least in part on determining a distance between the pixel of the frame and a corresponding feature of the first region of the search space.

Aspect 9: The apparatus of aspect 7, wherein the one or more processors are configured to: determine the image data within the region around the pixel of the frame does not correspond to the image data within the first region of the search space within the primitive; determine a second region of the search space, the second region of the search space having the predetermined size; and determine whether image data within the region around the pixel of the frame corresponds to image data within the second region of the search space.

Aspect 10: The apparatus of any of aspects 1 to 9, wherein: the pattern of light emitted by the structured light source includes a plurality of light points; and a feature within the set of uniquely identifiable features of the primitive includes two or more light points of the plurality of light points.

Aspect 11: The apparatus of aspect 10, wherein a light point of the feature corresponds to two or more pixels of the frame.

Aspect 12: The apparatus of any of aspects 1 to 11, wherein the structured light source is configured to emit the pattern of light using a diffractive optical element that simultaneously projects a plurality of patterns of light corresponding to the primitive.

Aspect 13: The apparatus of any of aspects 1 to 12, wherein the one or more processors are configured to: obtain an additional frame while the structured light source is not emitting the pattern of light based on the primitive; determine ambient light signals based at least in part on the additional frame; and subtract the ambient light signals from the frame before determining the first distance measurement associated with the pixel of the frame.

Aspect 14: The apparatus of aspect 13, wherein the one or more processors are configured to: determine light signals corresponding to multi-path interference using the frame after subtracting the ambient light signals from the frame; and subtract the light signals corresponding to multi-path interference from the frame before determining the first distance measurement associated with the pixel of the frame.

Aspect 15: The apparatus of any of aspects 1 to 14, wherein the one or more processors are configured to fit a function to light signals corresponding to the pixel of the frame before determining the first distance measurement associated with the pixel of the frame.

Aspect 16: The apparatus of any of aspects 1 to 15, wherein the apparatus includes a mobile device.

Aspect 17: The apparatus of any of aspects 1 to 16, further comprising a display.

Aspect 18: A method of generating one or more depth maps, the method comprising: obtaining a frame including a reflected pattern of light generated based on a pattern of light emitted by a structured light source, the pattern of light being based on a primitive that includes a set of uniquely identifiable features; determining, using a time-of-flight (ToF) sensor, a first distance measurement associated with a pixel of the frame; determining, based at least in part on the first distance measurement, a search space within the primitive, the search space including a subset of features from the set of uniquely identifiable features of the primitive; determining, based on searching the search space within the primitive, a feature of the primitive corresponding to a region around the pixel of the frame; determining a second distance measurement associated with the pixel of the frame based at least in part on determining the feature of the primitive from the search space within the primitive; and generating a depth map based at least in part on the second distance measurement.

Aspect 19: The method of aspect 18, further comprising: obtaining a first exposure of the frame associated with a first level of illumination; obtaining a second exposure of the frame associated with a second level of illumination that is different than the first level of illumination; and determining the first distance measurement associated with the pixel of the frame based at least in part on a comparison between a first light amplitude associated with the pixel in the first exposure and a second light amplitude associated with the pixel in the second exposure.

Aspect 20: The method of any of aspects 18 or 19, wherein the first distance measurement includes a range of distance measurements, and further comprising determining a size of the search space within the primitive based at least in part on the range of distance measurements, wherein a large range of distance measurements is associated with a large size of the search space.

Aspect 21: The method of aspect 20, further comprising determining the range of distance measurements based at least in part on a level of ambiguity associated with the ToF sensor, wherein a high level of ambiguity is associated with a large range of distance measurements.

Aspect 22: The method of any of aspects 18 to 21, further comprising: determining, based at least in part on the first distance measurement, an offset between a first location of the pixel of the frame and a second location of the feature of the primitive, wherein the offset is inversely proportional to the first distance measurement; and determining the search space within the primitive based at least in part on the offset.

Aspect 23: The method of aspect 22, further comprising setting a central axis of the search space within the primitive as the second location of the feature of the primitive.

Aspect 24: The method of any of aspects 18 to 23, wherein the region around the pixel of the frame has a predetermined size, the method further comprising: determining a first region of the search space, the first region of the search space having the predetermined size; and determining whether image data within the region around the pixel of the frame corresponds to image data within the first region of the search space.

Aspect 25: The method of aspect 24, further comprising: determining the image data within the region around the pixel of the frame corresponds to the image data within the first region of the search space; and determining the second distance measurement based at least in part on determining a distance between the pixel of the frame and a corresponding feature of the first region of the search space.

Aspect 26: The method of aspect 24, further comprising: determining the image data within the region around the pixel of the frame does not correspond to the image data within the first region of the search space within the primitive; determining a second region of the search space, the second region of the search space having the predetermined size; and determining whether image data within the region around the pixel of the frame corresponds to image data within the second region of the search space.

Aspect 27: The method of any of aspects 18 to 26, wherein: the pattern of light emitted by the structured light source includes a plurality of light points; and a feature within the set of uniquely identifiable features of the primitive includes two or more light points of the plurality of light points.

Aspect 28: The method of aspect 27, wherein a light point of the feature corresponds to two or more pixels of the frame.

Aspect 29: The method of any of aspects 18 to 28, further comprising: emitting, using the structured light source, the pattern of light using a diffractive optical element that simultaneously projects a plurality of patterns of light corresponding to the primitive.

Aspect 30: The method of any of aspects 18 to 29, further comprising: obtaining an additional frame while the structured light source is not emitting the pattern of light based on the primitive; determining ambient light signals based at least in part on the additional frame; and subtracting the ambient light signals from the frame before determining the first distance measurement associated with the pixel of the frame.

Aspect 31: The method of aspect 30, further comprising: determining light signals corresponding to multi-path interference using the frame after subtracting the ambient light signals from the frame; and subtracting the light signals corresponding to multi-path interference from the frame before determining the first distance measurement associated with the pixel of the frame.

Aspect 32: The method of aspect 30, further comprising: fitting a function to light signals corresponding to the pixel of the frame before determining the first distance measurement associated with the pixel of the frame.

Aspect 33. A computer-readable storage medium storing instructions that, when executed, cause one or more processors to perform any of the operations of Aspects 1 to 32.

Aspect 34. An apparatus comprising means for performing any of the operations of Aspects 1 to 32.

What is claimed is:

1. An apparatus for generating one or more depth maps, comprising:

a structured light source configured to emit a pattern of light based on a primitive, the primitive including a set of uniquely identifiable features;

a time-of-flight (ToF) sensor;

at least one memory; and one or more processors coupled to the at least one memory, the one or more processors configured to:

obtain a frame including a reflected pattern of light generated based on the pattern of light emitted by the structured light source;

determine, using the ToF sensor, a first distance measurement associated with a pixel of the frame;

determine, based on a level of ambiguity associated with the first distance measurement determined using the ToF sensor, a width of a search space within the primitive, the search space including a subset of features from the set of uniquely identifiable features of the primitive, wherein a greater level of ambiguity is associated with a greater width of the search space;

determine, based on searching the search space within the primitive, a feature of the primitive corresponding to a region around the pixel of the frame;

determine a second distance measurement associated with the pixel of the frame based at least in part on determining the feature of the primitive from the search space within the primitive; and generate a depth map based at least in part on the second distance measurement.

2. The apparatus of claim 1, wherein the one or more processors are configured to:

obtain a first exposure of the frame associated with a first level of illumination;

obtain a second exposure of the frame associated with a second level of illumination that is different than the first level of illumination; and determine the first distance measurement associated with the pixel of the frame based at least in part on a comparison between a first light amplitude associated with the pixel in the first exposure and a second light amplitude associated with the pixel in the second exposure.

3. The apparatus of claim 1, wherein:

the first distance measurement is determined to be within a range of distance measurements with an error margin; and the one or more processors are configured to determine a size of the search space within the primitive based at least in part on the range of distance measurements, wherein the range of distance measurements is positively correlated to the size of the search space.

4. The apparatus of claim 1, wherein the one or more processors are configured to:

determine, based at least in part on the first distance measurement, an offset between a first location of the pixel of the frame and a second location of the feature of the primitive, wherein the offset is inversely proportional to the first distance measurement; and determine the search space within the primitive based at least in part on the offset.

5. The apparatus of claim 4, wherein the one or more processors are configured to set a central axis of the search space within the primitive as the second location of the feature of the primitive.

6. The apparatus of claim 1, wherein the region around the pixel of the frame has a predetermined size, and wherein the one or more processors are configured to:

determine a first region of the search space, the first region of the search space having the predetermined size; and determine whether image data within the region around the pixel of the frame corresponds to image data within the first region of the search space.

7. The apparatus of claim 6, wherein the one or more processors are configured to:

determine the image data within the region around the pixel of the frame corresponds to the image data within the first region of the search space; and determine the second distance measurement based at least in part on determining a distance between the pixel of the frame and a corresponding feature of the first region of the search space.

8. The apparatus of claim 6, wherein the one or more processors are configured to:

determine the image data within the region around the pixel of the frame does not correspond to the image data within the first region of the search space within the primitive;

determine a second region of the search space, the second region of the search space having the predetermined size; and determine whether image data within the region around the pixel of the frame corresponds to image data within the second region of the search space.

9. The apparatus of claim 1, wherein:

the pattern of light emitted by the structured light source includes a plurality of light points; and a feature within the set of uniquely identifiable features of the primitive includes two or more light points of the plurality of light points.

10. The apparatus of claim 9, wherein a light point of the feature corresponds to two or more pixels of the frame.

11. The apparatus of claim 1, wherein the structured light source is configured to emit the pattern of light using a diffractive optical element that simultaneously projects a plurality of patterns of light corresponding to the primitive.

12. The apparatus of claim 1, wherein the one or more processors are configured to:

obtain an additional frame while the structured light source is not emitting the pattern of light based on the primitive;

determine ambient light signals based at least in part on the additional frame; and subtract the ambient light signals from the frame before determining the first distance measurement associated with the pixel of the frame.

13. The apparatus of claim 12, wherein the one or more processors are configured to:

determine light signals corresponding to multi-path interference using the frame after subtracting the ambient light signals from the frame; and subtract the light signals corresponding to multi-path interference from the frame before determining the first distance measurement associated with the pixel of the frame.

14. The apparatus of claim 1, wherein the one or more processors are configured to fit a function to light signals corresponding to the pixel of the frame before determining the first distance measurement associated with the pixel of the frame.

15. The apparatus of claim 1, wherein the apparatus includes a mobile device.

16. The apparatus of claim 1, further comprising a display.

17. A method of generating one or more depth maps, the method comprising:

obtaining a frame including a reflected pattern of light generated based on a pattern of light emitted by a structured light source, the pattern of light being based on a primitive that includes a set of uniquely identifiable features;

determining, using a time-of-flight (ToF) sensor, a first distance measurement associated with a pixel of the frame;

determining, based on a level of ambiguity associated with the first distance measurement determined using the ToF sensor, a width of a search space within the primitive, the search space including a subset of features from the set of uniquely identifiable features of the primitive, wherein a greater level of ambiguity is associated with a greater width of the search space;

determining, based on searching the search space within the primitive, a feature of the primitive corresponding to a region around the pixel of the frame;

determining a second distance measurement associated with the pixel of the frame based at least in part on determining the feature of the primitive from the search space within the primitive; and generating a depth map based at least in part on the second distance measurement.

18. The method of claim 17, further comprising:

obtaining a first exposure of the frame associated with a first level of illumination;

obtaining a second exposure of the frame associated with a second level of illumination that is different than the first level of illumination; and determining the first distance measurement associated with the pixel of the frame based at least in part on a comparison between a first light amplitude associated with the pixel in the first exposure and a second light amplitude associated with the pixel in the second exposure.

19. The method of claim 17, wherein the first distance measurement includes is determined to be within a range of distance measurements with an error margin, and further comprising:

determining a size of the search space within the primitive based at least in part on the range of distance measurements, wherein the range of distance measurements is positively correlated to the size of the search space.

20. The method of claim 17, further comprising:

determining, based at least in part on the first distance measurement, an offset between a first location of the pixel of the frame and a second location of the feature of the primitive, wherein the offset is inversely proportional to the first distance measurement; and determining the search space within the primitive based at least in part on the offset.

21. The method of claim 20, further comprising setting a central axis of the search space within the primitive as the second location of the feature of the primitive.

22. The method of claim 17, wherein the region around the pixel of the frame has a predetermined size, the method further comprising:

determining a first region of the search space, the first region of the search space having the predetermined size; and determining whether image data within the region around the pixel of the frame corresponds to image data within the first region of the search space.

23. The method of claim 22, further comprising:

determining the image data within the region around the pixel of the frame corresponds to the image data within the first region of the search space; and determining the second distance measurement based at least in part on determining a distance between the pixel of the frame and a corresponding feature of the first region of the search space.

24. The method of claim 22, further comprising:

determining the image data within the region around the pixel of the frame does not correspond to the image data within the first region of the search space within the primitive;

determining a second region of the search space, the second region of the search space having the predetermined size; and determining whether image data within the region around the pixel of the frame corresponds to image data within the second region of the search space.

25. The method of claim 17, wherein:

the pattern of light emitted by the structured light source includes a plurality of light points; and a feature within the set of uniquely identifiable features of the primitive includes two or more light points of the plurality of light points.

26. The method of claim 25, wherein a light point of the feature corresponds to two or more pixels of the frame.

27. The method of claim 17, further comprising:

emitting, using the structured light source, the pattern of light using a diffractive optical element that simultaneously projects a plurality of patterns of light corresponding to the primitive.

28. The method of claim 17, further comprising:

obtaining an additional frame while the structured light source is not emitting the pattern of light based on the primitive;

determining ambient light signals based at least in part on the additional frame; and subtracting the ambient light signals from the frame before determining the first distance measurement associated with the pixel of the frame.

29. The method of claim 28, further comprising:

determining light signals corresponding to multi-path interference using the frame after subtracting the ambient light signals from the frame; and subtracting the light signals corresponding to multi-path interference from the frame before determining the first distance measurement associated with the pixel of the frame.

30. The method of claim 17, further comprising fitting a function to light signals corresponding to the pixel of the frame before determining the first distance measurement associated with the pixel of the frame.

* * * * *